United States Patent
Nomura et al.

(10) Patent No.: US 6,520,691 B2
(45) Date of Patent: Feb. 18, 2003

(54) LENS BARRIER OPENING/CLOSING DEVICE OF A MOVABLE LENS BARREL

(75) Inventors: Hiroshi Nomura, Saitama (JP); Nobuaki Aoki, Tokyo (JP); Yoshihiro Yamazaki, Saitama (JP); Satoru Nakamura, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/774,111

(22) Filed: Jan. 31, 2001

(65) Prior Publication Data

US 2001/0024573 A1 Sep. 27, 2001

(30) Foreign Application Priority Data

Jan. 31, 2000 (JP) .......................... 2000-022747
Jan. 31, 2000 (JP) .......................... 2000-022748

(51) Int. Cl.[7] .......................... G03B 17/04; G03B 17/00
(52) U.S. Cl. .......................... 396/448; 396/349
(58) Field of Search .......................... 396/348, 349, 396/448; 359/819, 826

(56) References Cited

U.S. PATENT DOCUMENTS

| | | |
|---|---|---|
| 4,989,027 A | 1/1991 | Ishii et al. |
| 5,130,730 A | 7/1992 | Ishii et al. |
| 5,136,315 A * | 8/1992 | Nomura ........................ 396/349 |
| 5,159,372 A | 10/1992 | Nomura |
| 5,614,973 A | 3/1997 | Azegami |
| 6,264,380 B1 * | 7/2001 | Omiya ........................ 396/448 |

* cited by examiner

Primary Examiner—Russell Adams
Assistant Examiner—Arthur A Smith
(74) Attorney, Agent, or Firm—Greenblum & Bernstein, P.L.C.

(57) ABSTRACT

A lens barrier opening/closing device of a movable lens barrel includes a barrier blade which is driven to open and close a photographic aperture; a barrier drive ring driven to rotate about an optical axis; a first biasing device which biases the barrier drive ring in a rotational direction; a rotational barrel which rotates about the optical axis; a receiving surface formed on the barrier drive ring to extend parallel to the optical axis; and a transmission surface, formed on the rotational barrel, extending parallel to the optical axis. The receiving surface and the transmission surface are engaged with each other to rotate the barrier drive ring together with the rotational barrel about the optical axis in a direction against a biasing force of the first biasing device when the movable lens barrel moves from either the photographing position to the accommodation position or vise versa.

28 Claims, 17 Drawing Sheets

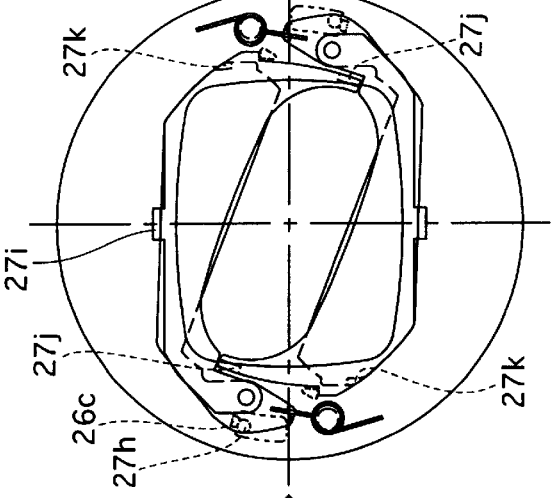
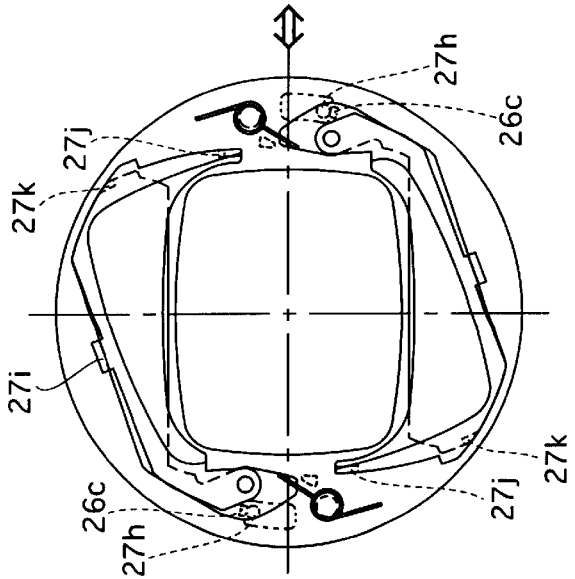

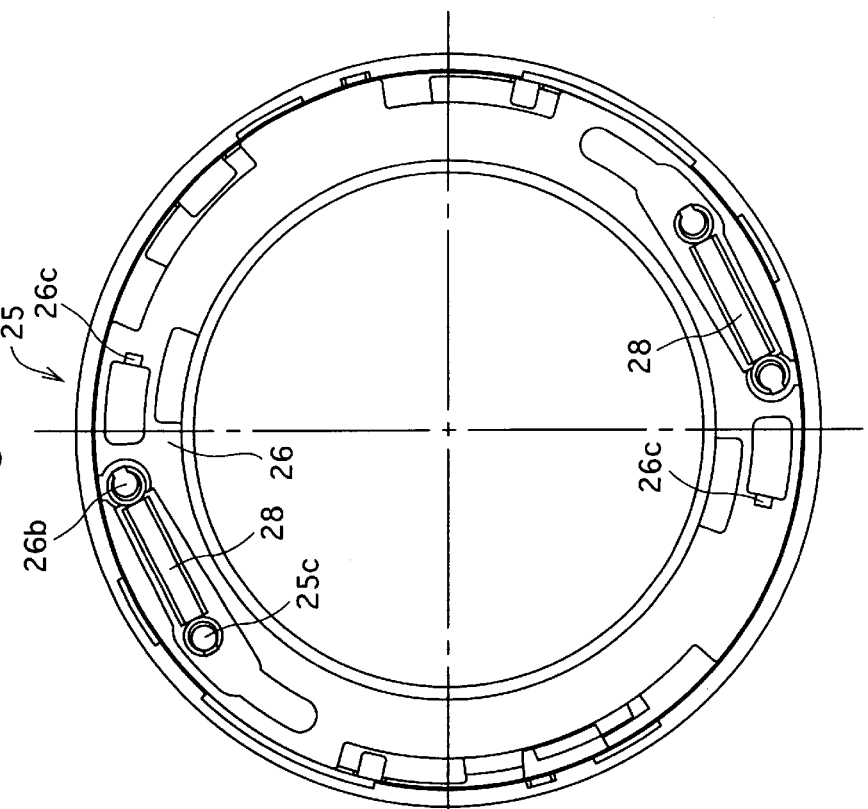
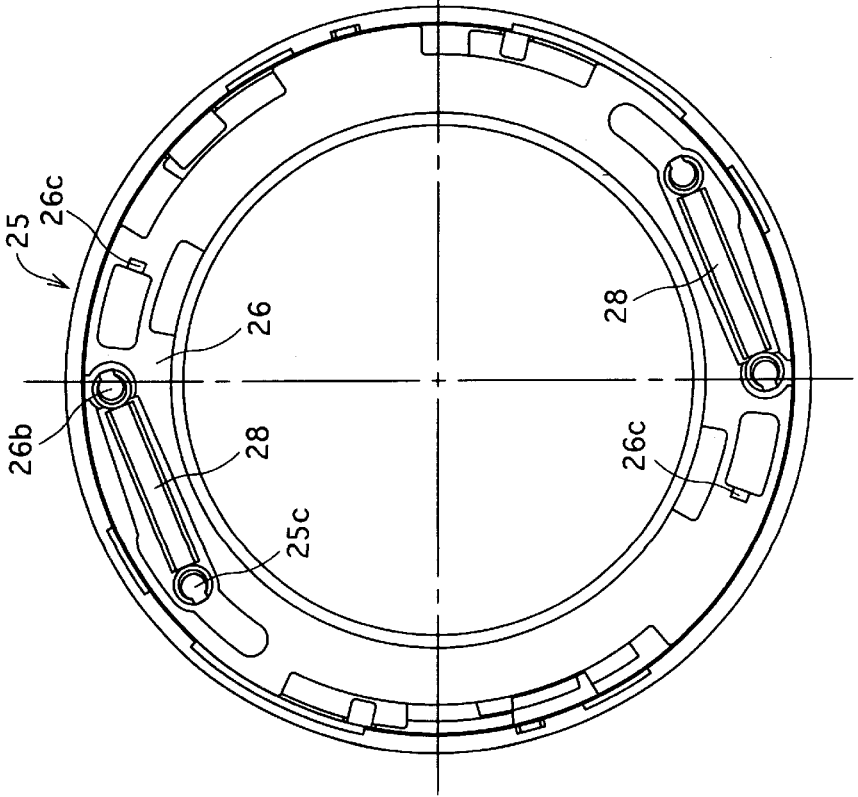

LENS BARRIER OPENING/CLOSING DEVICE OF A MOVABLE LENS BARREL

BACKGROUND OF THE INVENTION

1. Field of the Invention

The present invention relates to a lens barrier opening/closing device for opening and closing a lens barrier which is disposed in a front end of a movable lens barrel for the purpose of preventing the front surface of the lens from being stained or damaged.

2. Description of the Related Art

A zoom lens of a camera which has a movable barrel driven to advance from a housed position (accommodation position) to a photographing position when the power is turned ON is known in the art. Such a zoom lens which is provided in the front end thereof with a lens barrier (which generally has a plurality of movable barrier blades) that is driven to open and close a forefront photographic aperture of the zoom lens by moving the movable barrel of the zoom lens from the housed position to the advance position and from the advance position to the housed position, in that order, is also known in the art.

In one of the lens barriers of this type, a barrier drive ring is provided to be rotatable about the optical axis of the zoom lens to open and close the barrier blades. The barrier drive ring is constantly biased toward one rotational end thereof to open the barrier blades by a spring. A rearward movement of the movable barrel of the zoom lens from the photographing position to the housed position causes another movable member of the zoom lens to be engaged with the barrier drive ring to rotate the same in one direction to close the barrier blades against the spring force. Conversely, a forward movement of the movable barrel of the zoom lens from the housed position to the photographing position causes the above-mentioned movable member to be disengaged from the barrier drive ring, thereby allowing the barrier drive ring to rotate in the other direction to open the barrier blades by the spring force.

In an alternative lens barriers of the aforementioned type, the barrier drive ring is constantly biased toward one rotational end thereof to open the barrier blades by a spring (first spring), while the barrier blades themselves are constantly biased in a direction to be closed by another spring or springs (second spring) whose spring force is smaller than the first spring. A rearward movement of the movable barrel of the zoom lens from the photographing position to the housed position causes another movable member of the zoom lens to be engaged with the barrier drive ring to rotate the same in one direction to restrict the spring force of the first spring, thereby allowing the barrier blades to be closed by the spring force of the second spring.

In these types of lens barriers, the barrier blades can be reliably opened and closed by a spring (biasing device) having a large spring force (large biasing force). However, the performance of the advancing/retreating operation of the movable barrel of the zoom lens, which moves between the housed position and the photographing position, deteriorates if the spring force is excessively large. This is because the driving force generated by a movement of the movable barrel between the housed position and the photographing position to drive the barrier blades is originally used to make the movable barrel itself advance to the photographing position or retreat to the housed position.

The difference between the photographing position and the housed position of the movable barrel can be regarded as the difference between two axial positions (two separate positions on the optical axis of the zoom lens) of the movable barrel, so that the barrier drive ring can be rotated by converting a linear movement of a movable member in the optical axis direction into a rotational movement about the optical axis. For instance, in a conventional lens barrier opening/closing device, a linearly movable barrel which moves in the direction of the optical axis without rotating about the optical axis is provided with an inclined surface which is inclined with respect to the direction of the optical axis, while the barrier drive ring is provided with another inclined surface which is inclined with respect to the direction of the optical axis. When the linearly movable barrel moves in the direction of the optical axis toward the barrier drive ring, the inclined surface of the linearly movable barrel is engaged with the inclined surface of the barrier drive ring which is pushed in the same direction, which causes the barrier drive ring to rotate about the optical axis. However, according to this structure, such an operation of converting a driving force in the direction of the optical axis into a rotational driving force about the optical axis results in a large energy loss. Accordingly, although the spring (biasing device) that biases the barrier blades preferably has a large spring force to reliably open and close as mentioned above, the performance of the advancing/retreating operation of the movable barrel of the zoom lens may deteriorate due to the large spring force since energy loss in an operation of transmitting a driving force from the linear movable member to the barrier drive is large. If the driving force for moving the movable barrel in the direction of the optical axis is increased to prevent this from occurring, an excessive load is exerted on a drive motor which drives the movable barrel.

There is further problem in such lens barrier opening/closing devices in which the barrier blades are opened and closed by rotation of the barrier drive ring. Namely, the lens barrier may not function properly if the rotational center of the barrier drive ring is eccentric from a predetermined position (generally the optical axis of the photographic optical system of the zoom lens). For instance, if the lens barrier is provided with a pair of barrier blades which are respectively pivoted at a pair of pivots fixed at different positions in a circumference of the lens barrier so that each barrier blade rotates about the corresponding pivot to be opened and closed, and if the barrier drive ring is provided thereon with a pair of engaging portions which can be respectively engaged with and disengaged from the pair of barrier blades, the pair of engaging portions of the barrier drive ring cannot be respectively engaged with and/or disengaged from the pair of barrier blades properly if the rotational center of the barrier drive ring is eccentric relative to the predetermined position. In this case, one of the pair of barrier blades may not be completely closed when the zoom lens retreats to the housed position, and/or may not be completely opened when the zoom lens advances to the photographing position.

SUMMARY OF THE INVENTION

The present invention has been devised in view of the matters mentioned above, and accordingly, an object of the present invention is to provide a lens barrier opening/closing device with which the lens barrier operates with reliability without deteriorating the operational performance of the movable lens barrel.

Another object of the present invention is to provide a lens barrier opening/closing apparatus which prevents the rotational center of the barrier drive ring from being eccentric from the optical axis of the photographic optical axis so that the lens barrier operates reliably. Other objects of the invention will become apparent to one skilled in the art from the following disclosure and the appended claims.

To achieve the object mentioned above, according to an aspect of the present invention, a lens barrier opening/closing device of a movable lens barrel driven to move between an accommodation position and a photographing position is provided, including at least one barrier blade which is driven to open and close a photographic aperture formed at the front end wall of the movable lens barrel when the movable lens barrel is in the photographing position and the accommodation position, respectively; a barrier drive ring driven to rotate about an optical axis to drive the barrier blade; a first biasing device which biases the barrier drive ring in a predetermined rotational direction; a rotational barrel which at least rotates about the optical axis when the movable lens barrel moves between the accommodation position and the photographing position; a rotational-force receiving surface formed on the barrier drive ring, which extends parallel to the optical axis; and a rotational-force transmission surface formed on the rotational barrel, which extends parallel to the optical axis. The rotational-force receiving surface and the rotational-force transmission surface are engaged with each other to rotate the barrier drive ring together with the rotational barrel about the optical axis in a direction against a biasing force of the first biasing device when the movable lens barrel moves from one of the photographing position and the accommodation position to the other of the photographing position and the accommodation position.

Preferably, the barrier drive ring includes a drive lever which extends substantially parallel to the optical axis toward the rotational barrel, the drive lever including the rotational-force receiving surface thereon.

Preferably, the rotational barrel includes a recess formed to allow the drive lever to enter the recess, the rotational-force transmission surface being formed as a wall of the recess.

The movable lens barrel can be an element of a zoom lens of a camera.

Preferably, the first biasing device includes at least one helical extension spring.

In an embodiment, the barrier drive ring and the rotational barrel rotate relative to each other about the optical axis and move relative to each other in a direction of the optical axis when the movable lens barrel moves between the photographing position and the accommodation position. The barrier drive ring and the rotational barrel are apart from each other so that the rotational-force receiving surface and the rotational-force transmission surface do not overlap each other in the direction of the optical axis when the movable lens barrel is in a specific one of the photographing position and the accommodation position in which the rotational barrel does not drive the barrier drive ring to rotate about the optical axis via the rotational-force receiving surface and the rotational-force transmission surface.

In an embodiment, the lens barrier opening/closing device further includes a linearly movable barrel positioned around the rotational barrel, guided in the direction of the optical axis without rotating about the optical axis, and supporting the barrier drive ring in a front end of the linearly movable barrel so that the barrier drive ring is rotatable about the optical axis; a radially inward pin formed on the linearly movable barrel to extend radially inwards; and a guide groove, corresponding to the radially inward pin, formed on an outer peripheral surface of the rotational barrel to be engaged with the radially inward pin to move the linearly movable barrel in the direction of the optical axis by rotation of the rotational barrel.

Preferably, the movable lens barrel is an element of a zoom lens of a camera, and the linearly movable barrel functions as a movable lens hood which advances relative to the rotational barrel when the zoom lens is set at a telephoto extremity thereof having a narrow angle of view, and which retreats relative to the rotational barrel when the zoom lens is set at a wide-angle extremity thereof having a wide angle of view.

In an embodiment, the lens barrier opening/closing device further includes a second biasing device which biases the barrier blade in a direction toward one of an open position and a closed position of the barrier blade against the biasing force of the first biasing device, a biasing force of the second biasing device being smaller than that of the first biasing device. The barrier blade is driven by the biasing force of the second biasing device when the barrier drive ring is driven to rotate against the biasing force of the first biasing device by rotation of the rotational barrel.

Preferably, the second biasing device includes at least one torsion spring.

According to another aspect of the present invention, a lens barrier opening/closing device of a movable lens barrel is provided, including at least one barrier blade which is driven to open and close a photographic aperture formed at the front of the movable lens barrel; a rotational barrel which at least rotates about an optical axis when the movable lens barrel moves between an accommodation position and a photographing position; a barrier drive ring driven to rotate about the optical axis to drive the barrier blade; an opening biasing device which biases the barrier drive ring in a direction to open the barrier blade; a rotational-force receiving surface formed on the barrier drive ring to extend parallel to the optical axis; and a rotational-force transmission surface formed on the rotational barrel to extend parallel to the optical axis. The rotational-force receiving surface and the rotational-force transmission surface are engaged with each other to rotate the barrier drive ring about the optical axis in a direction to close the barrier blade against the biasing force of the opening biasing device while the rotational barrel rotates when the movable lens barrel moves from the photographing position to the accommodation position.

In an embodiment, the lens barrier opening/closing device further includes a linearly movable barrel guided in a direction of the optical axis without rotating about the optical axis, the linearly movable barrel supporting the barrier drive ring at a front end thereof so that the barrier drive ring is rotatable about the optical axis.

In an embodiment, the lens barrier opening/closing device further includes at least one engaging portion formed on the barrier drive ring to be engageable with the barrier blade; and a closing biasing device which biases the barrier blade in a direction to close the photographic aperture, a biasing force of the closing biasing device being smaller than that of the opening biasing device. The engaging portion of the barrier drive ring held at a position to open the barrier blade by the biasing force of the opening biasing device pushes the barrier blade to open the barrier blade when the movable lens barrel is in the photographing position. The engaging portion is disengaged from the barrier blade so that the barrier blade is driven to be closed by the biasing force of the closing biasing device when the barrier drive ring is driven to rotate about the optical axis against the biasing force of the opening biasing device by rotation of the rotational barrel when the movable lens barrel moves from the photographing position to the accommodation position.

According to another aspect of the present invention, a camera is provided, including a movable lens barrel driven to move between a photographing position an accommodation position when the power of the camera is turned ON and OFF, respectively; at least one barrier blade driven to open and close a photographic aperture formed at the front of the movable lens barrel when the movable lens barrel is in the photographing position and the accommodation position, respectively; a barrier drive ring driven to rotate about an optical axis to drive the barrier blade; at least one spring which biases the barrier drive ring in a direction to open the barrier blade; a rotational barrel which rotates about the optical axis when the movable lens barrel moves between the accommodation position and the photographing position; a lever formed on the barrier drive ring to extend toward the rotational barrel, the lever including a first engaging surface extending parallel to the optical axis; and a recess formed on the rotational barrel so that the lever can enter the recess in a direction of the optical axis, the recess including a second engaging surface extending parallel to the optical axis. The first engaging surface and the second engaging surface are engaged with each other to rotate the barrier drive ring about the optical axis in a direction to close the barrier blade against the biasing force of the biasing device when the movable lens barrel moves from the photographing position to the accommodation position.

According to another aspect of the present invention a lens barrier opening/closing device of a movable lens barrel driven to move between an accommodation position and a photographing position is provided, including at least one barrier blade which is driven to open and close a photographic aperture formed at the front of the movable lens barrel when the movable lens barrel is in the photographing position and the accommodation position, respectively; a linearly movable barrel guided in a direction of an optical axis without rotating about the optical axis; a barrier drive ring driven to rotate about the optical axis to drive the barrier blade, the linearly movable barrel supporting the barrier drive ring in a front end of the linearly movable barrel to be rotatable about the optical axis; and a pair of ring biasing springs positioned between the barrier drive ring and the linearly movable barrel on opposite sides with respect to the optical axis in a radial direction to bias the barrier drive ring in a predetermined rotational direction. The barrier drive ring is driven to rotate in a rotational direction opposite to the predetermined rotational direction against a biasing force of the pair of ring biasing springs by a movement of a movable member provided in the lens barrel when the movable lens barrel moves from one of the photographing position and the accommodation position to the other of the photographing position and the accommodation position.

In an embodiment, the lens barrier opening/closing device further includes at least one barrier biasing spring which biases the barrier blade in a direction opposite to a biasing direction of the pair of ring biasing springs toward one of an open position and a closed position of the barrier blade, wherein a biasing force of the barrier biasing spring is smaller than that of the pair of ring biasing springs, and wherein the barrier blade is driven by the biasing force of the barrier biasing spring to move to one of the open position and the closed position when the barrier drive ring is driven to rotate against the biasing force of the pair of ring biasing springs.

In an embodiment, the barrier blade includes at least one pair of barrier blades; the barrier biasing spring includes a pair of barrier biasing springs positioned on opposite sides with respect to the optical axis in the radial direction to bias each of the at least one pair of barrier blades toward one of the open position and the closed position; the barrier drive ring includes at least one pair of engaging portions which can be engaged with the at least one pair of barrier blades, respectively. The barrier drive ring is engaged with at least one pair of the barrier blades to push the at least one pair of barrier blades via the at least one pair of engaging portions against a biasing force of the pair of barrier biasing springs when driven to rotate about the optical axis in the predetermined rotational direction. The barrier drive ring is disengaged from the at least one pair of barrier blades when driven to rotate about the optical axis against a biasing force of the pair of ring biasing springs via the movement of the movable member.

In an embodiment, the linearly movable barrel includes a pair of first protrusions positioned on opposite sides with respect to the optical axis in the radial direction, the barrier drive ring includes a pair of second protrusions positioned on opposite sides with respect to the optical axis in the radial direction, the pair of ring biasing springs are formed as two helical extension springs, and the opposite ends of one of the two helical extension springs are connected to one of the pair of first protrusions and one of the pair of second protrusions, respectively, while the opposite ends of the other of the two helical extension springs are connected to the other of the pair of first protrusions and the other of the pair of second protrusions, respectively.

In an embodiment, the pair of ring biasing springs bias the barrier drive ring in a first rotational direction to drive the barrier blade to open the photographic aperture, and the barrier drive ring is driven to rotate in a second rotational direction opposite to the first rotational direction to drive the barrier blade to close the photographic aperture when the movable lens barrel moves from the photographing position to the accommodation position.

Preferably, the barrier biasing spring includes at least one torsion spring.

Preferably, the movable lens barrel is an element of a zoom lens of a camera.

In an embodiment, the linearly movable barrel functions as a movable lens hood which advances relative to the rotational barrel when-the zoom lens is set at a telephoto extremity thereof having a narrow angle of view, and which retreats relative to the rotational barrel when the zoom lens is set at a wide-angle extremity thereof having a wide angle of view.

According to another aspect of the present invention, a camera is provided, including a movable lens barrel driven to move between a photographing position an accommodation position when the power of the camera is turned ON and OFF, respectively; at least one barrier blade driven to open and close a photographic aperture formed at the front of the movable lens barrel when the movable lens barrel is in the photographing position and the accommodation position, respectively; a linearly movable barrel guided in a direction of an optical axis without rotating about the optical axis; a barrier drive ring driven to rotate about the optical axis to drive the barrier blade, the linearly movable barrel supporting the barrier drive ring in a front end thereof so that the barrier drive ring is rotatable about the optical axis; a rotational barrel which rotates about the optical axis when the movable lens barrel moves between the accommodation position and the photographing position; and a pair of springs positioned between the barrier drive ring and the linearly movable barrel on opposite sides, with respect to the optical axis in a radial direction, to bias the barrier drive ring in a predetermined rotational direction. The barrier drive ring is driven to rotate in a rotational direction opposite to the biased rotational direction by rotation of the rotational barrel when the movable lens barrel moves from one of the photographing position and the accommodation position to the other of the photographing position and the accommodation position.

The present disclosure relates to subject matter contained in Japanese Patent Applications Nos.2000-22747 and 2000-22748 (both filed on Jan. 31, 2000) which are expressly incorporated herein by reference in their entireties.

BRIEF DESCRIPTION OF THE DRAWINGS

The present invention will be described below in detail with reference to the accompanying drawings in which:

FIG. 15A is a schematic front view of the barrier block, showing two pairs of barrier blades in a fully open position;

FIG. 15B is a schematic front view of the barrier block, showing the two pairs of barrier blades in a half-closed position;

FIG. 15C is a schematic front view of the barrier block, showing the two pairs of barrier blades in a fully closed position;

FIG. 17 is a front view of the external barrel that is supported by the external barrel to be freely rotatable about the optical axis, in a state where the barrier drive ring is rotated to one rotational limit thereof to thereby fully close the two pairs of barrier blades; and FIG. 18 is a front view of the external barrel shown in FIG. 17, in a state where the barrier drive ring is rotated to the other rotational limit thereof to thereby fully open the two pairs of barrier blades.

DESCRIPTION OF THE PREFERRED EMBODIMENT

Figure 1:
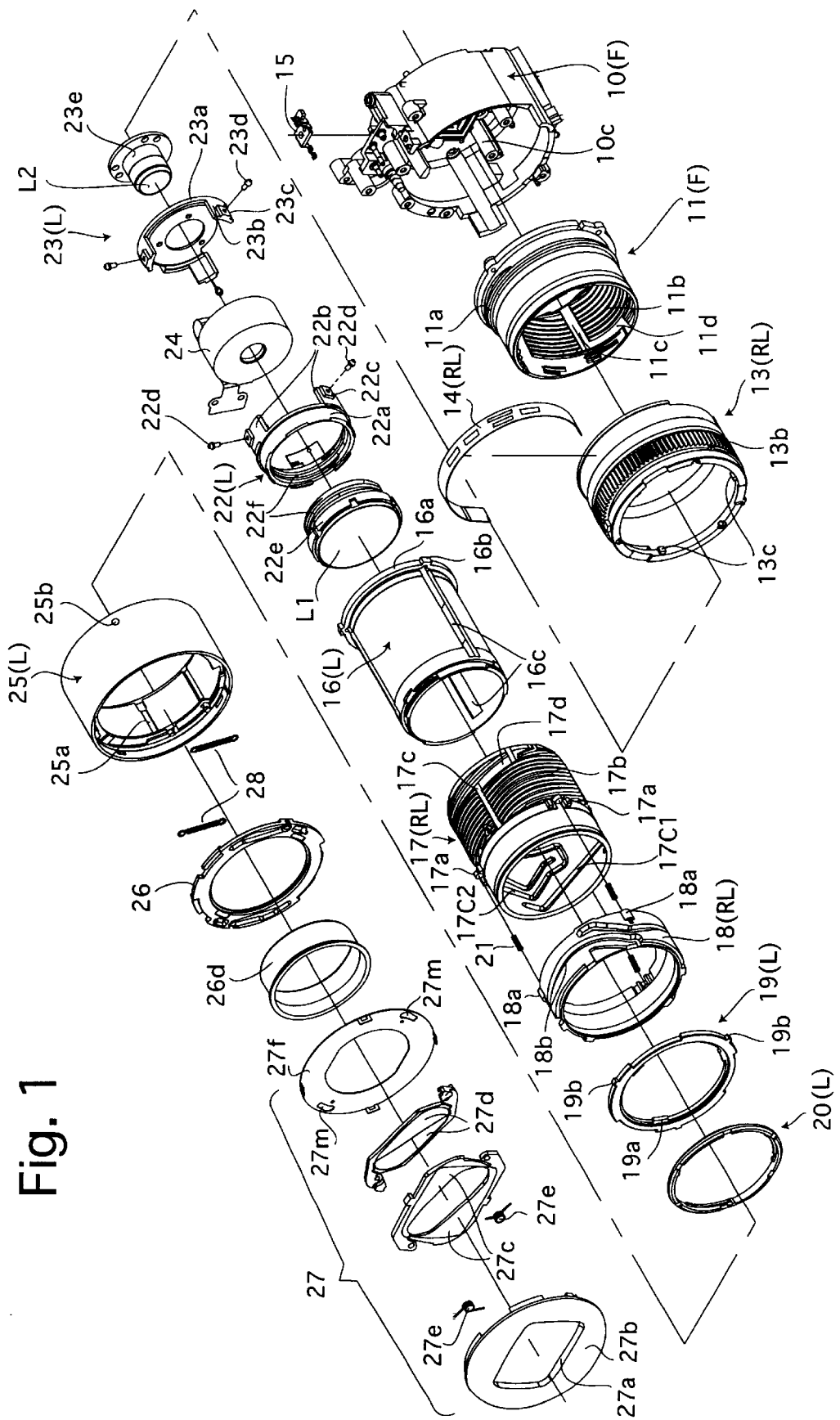
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
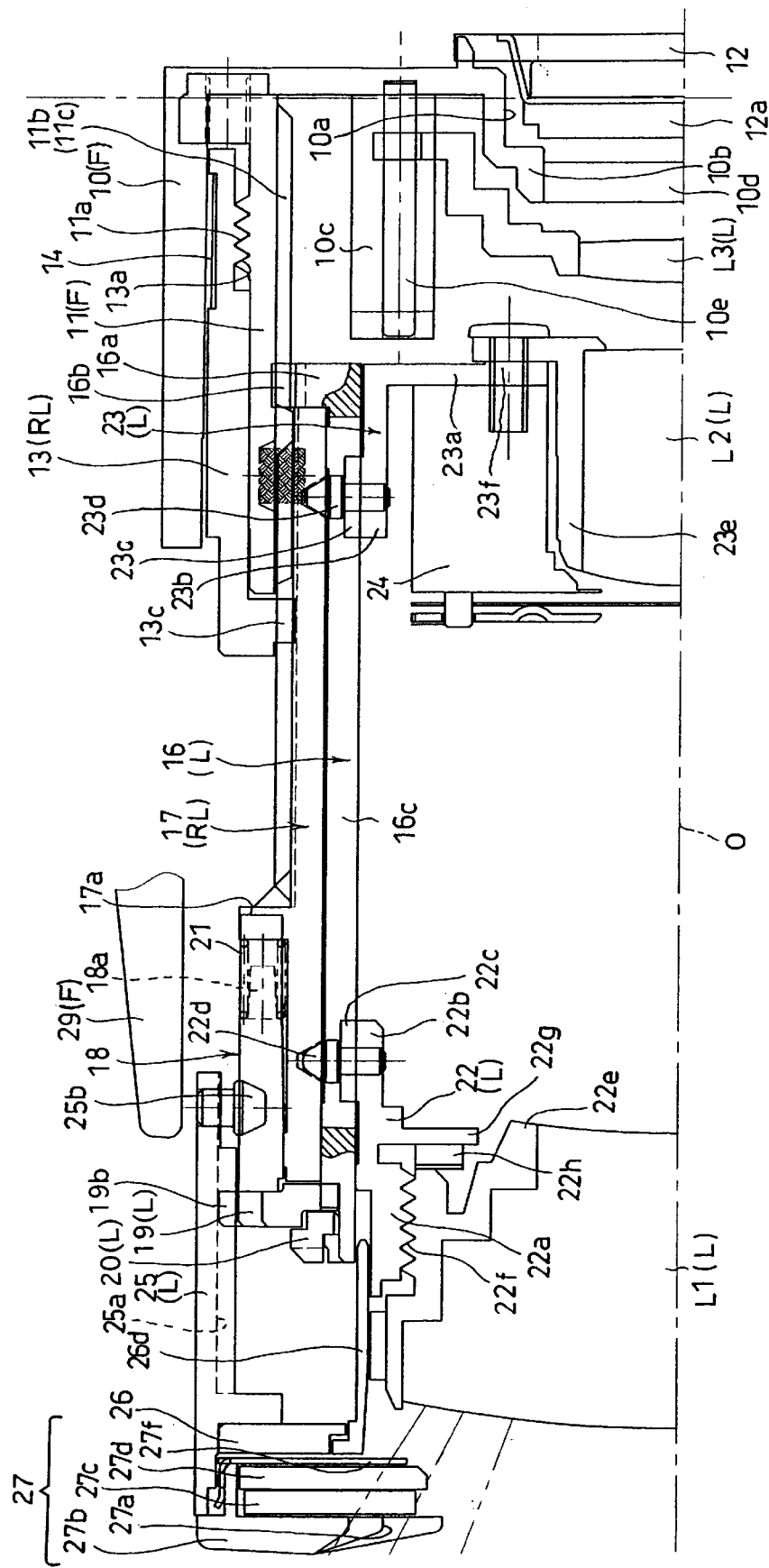
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1(L), a second lens group (middle lens group) L2(L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 2) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10(F) which is fixed to a camera body of a digital camera (not shown). The housing 10 can be integral with the camera body to be provided as an element thereof. The zoom lens is provided in the housing 10 with a stationary barrel 11(F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13(RL). The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14(RL) is fixed on an outer peripheral surface of the rotational barrel 13 along a circumference thereof, while a brush 15(F) that is in contact with the coding plate 14 is fixed to the housing 10. The brush 15 remains in sliding contact with the coding plate 14 regardless of a movement of the coding plate 14 relative to the brush 15 when the coding plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. However, alternatively, the rotational barrel 13 can be supported on the stationary barrel 11 so as to be able to rotate freely about the optical axis O without moving in the optical axis direction relative to the stationary barrel 11.

The zoom lens is further provided with a linear guide barrel 16(L), a first cam barrel 17(RL) and a second cam barrel (rotational barrel/movable member) 18(RL). The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19(L) is fixed to the front end of the linear guide barrel 16 via a retainer ring 20(L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam ring 18, which is fitted on the front end of the first cam barrel 17, is provided at the rear end thereof with three linear guide portions 18a (only two are shown in FIG. 1) at 120° intervals about the axis of the second cam ring 18. Each of the three linear guide portions 18a is provided with a spring holding groove 18a1, and a pair of guide grooves 18a2 positioned on the opposite sides of the spring holding groove 18a1 in a circumferential direction of the second cam ring 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam ring 18 to be slidable in the optical axis direction relative to the second cam ring 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The linear guide barrel 16 is further provided with three linear guide slots 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
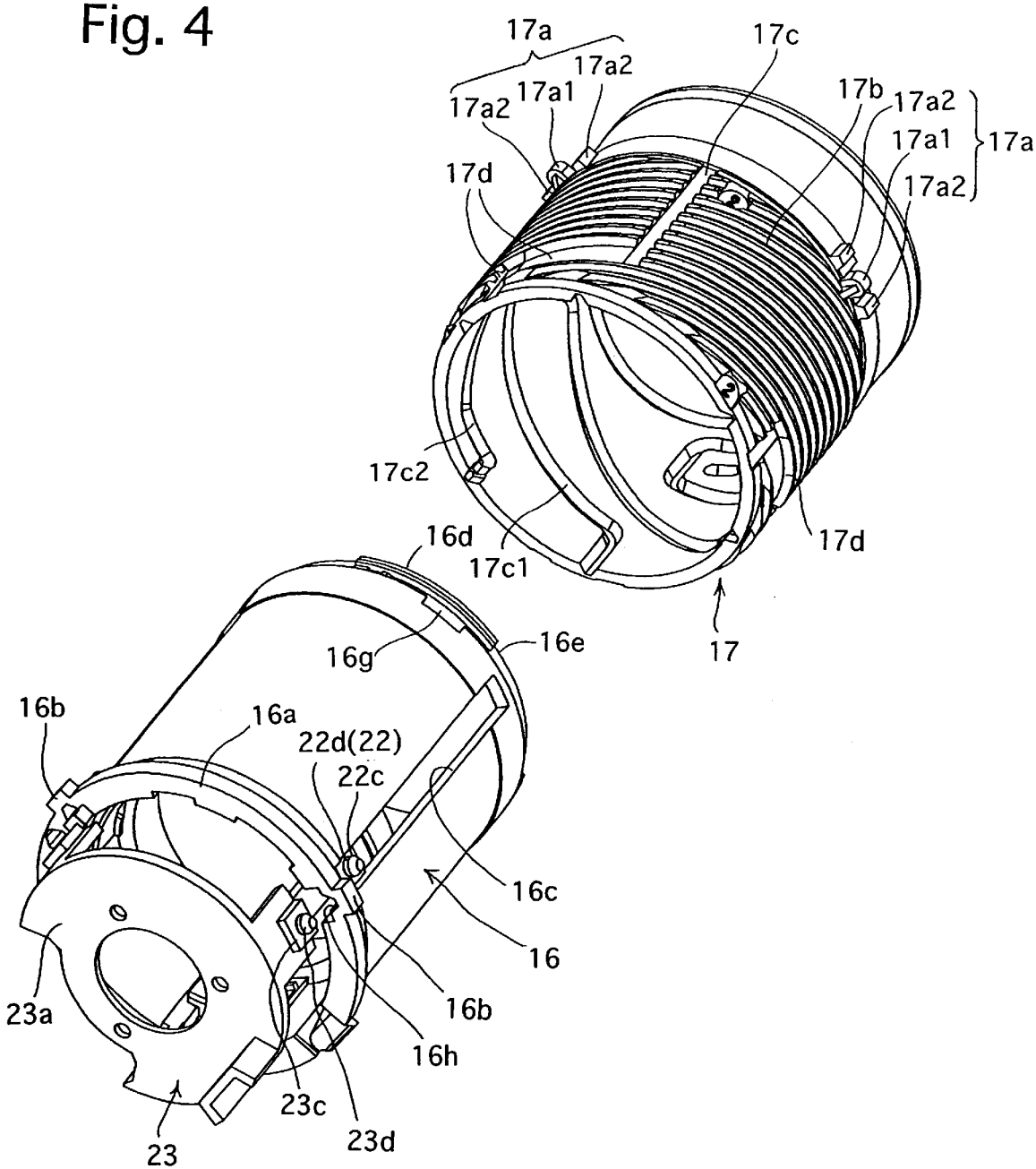
FIG. 4 is an exploded perspective view of the first cam barrel shown in FIG. 3, a linear guide barrel, a first lens frame and a second lens frame.
Figure 5:
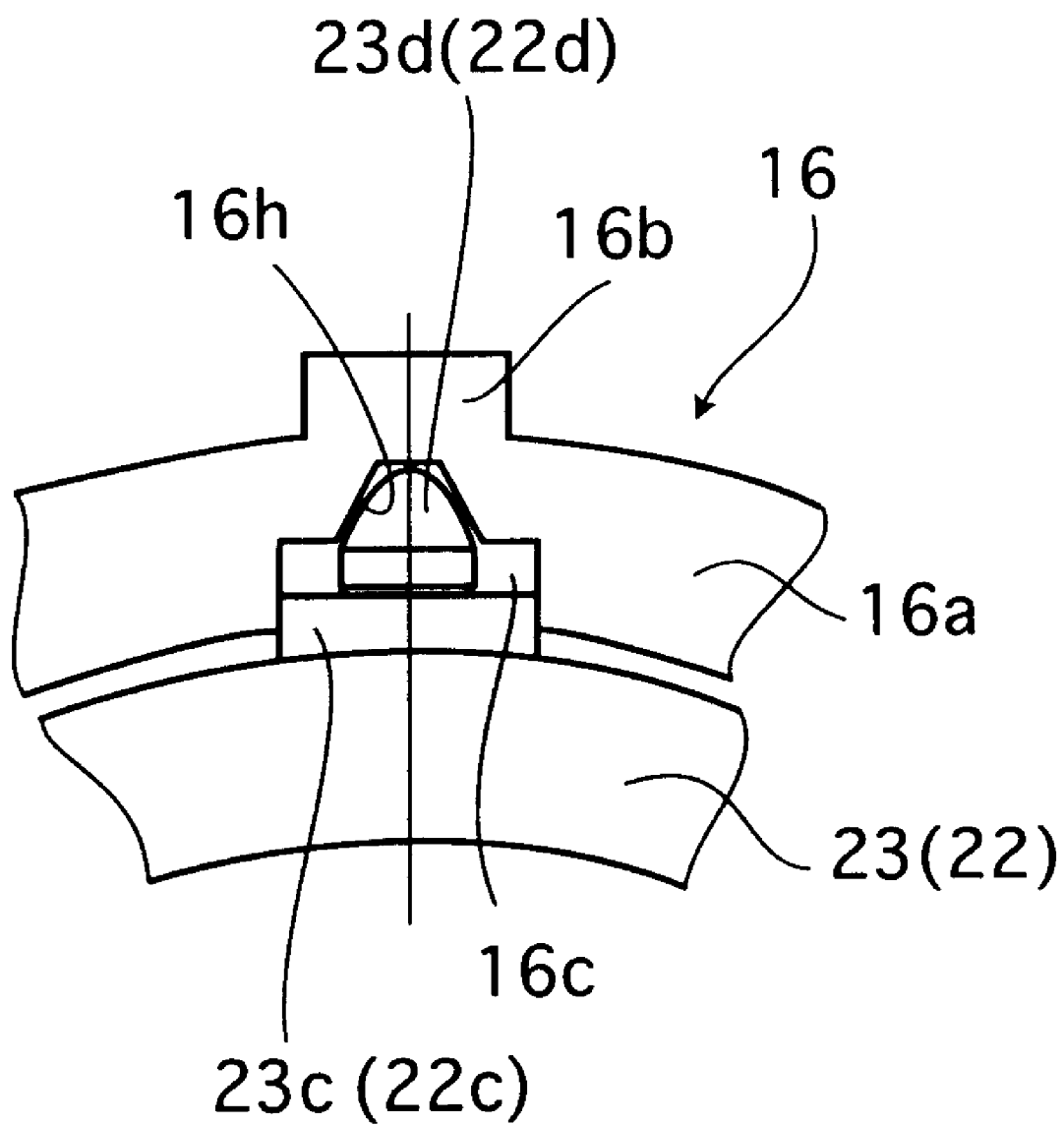
FIG. 5 is a fragmentary rear view of the linear guide barrel and the first lens frame, showing the periphery of an insertion groove of the linear guide barrel.
Figure 6:
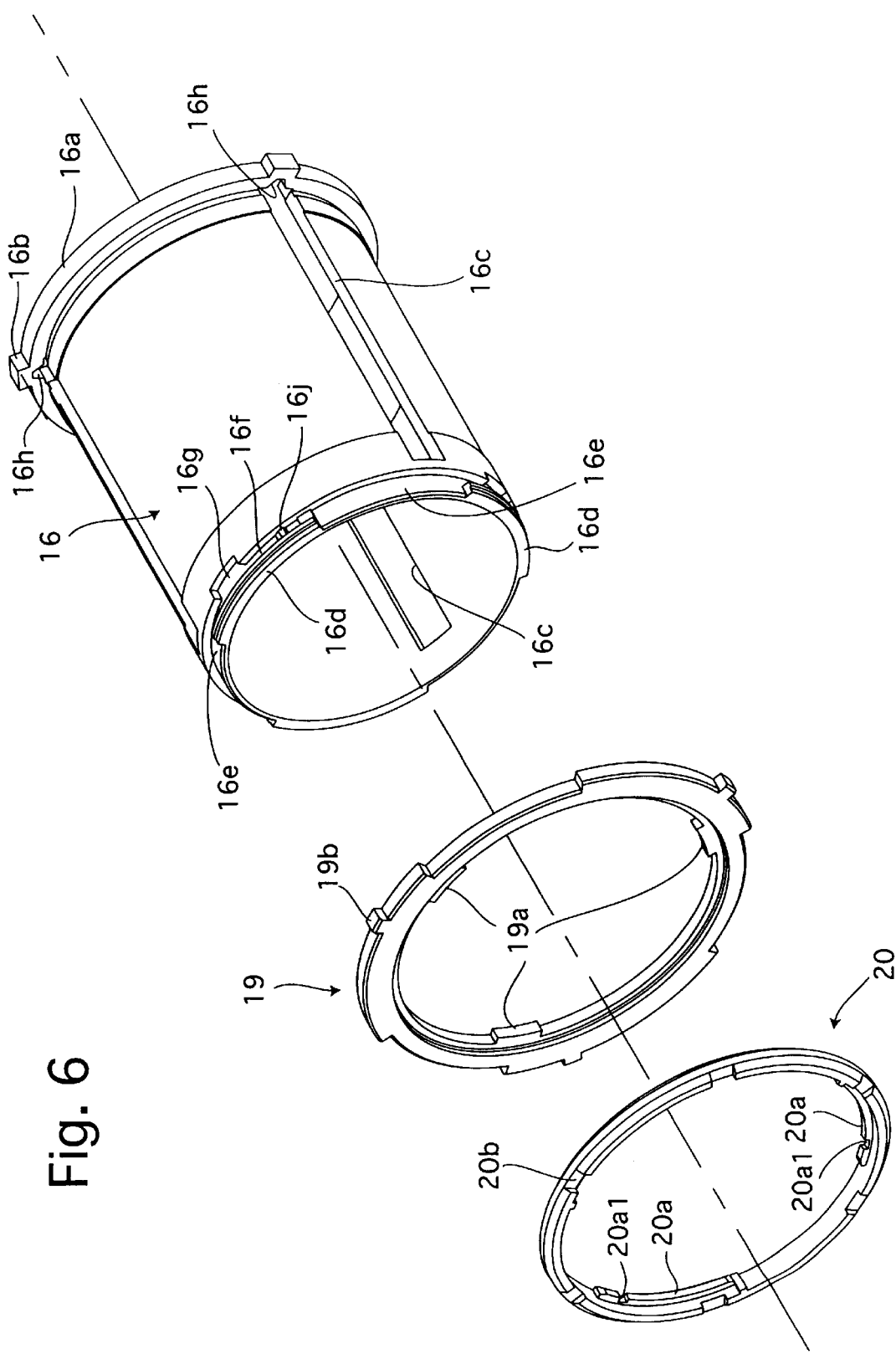
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin (cam follower) 22d and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and thee rotational barrel 13, each of the three linear guide projections 16b of the linear guide barrel 16 is inserted into the corresponding linear guide groove 11c of the stationary barrel 11 via a corresponding introducing groove lid formed on an inner peripheral surface of the stationary barrel 11, and each of the three inward projections 13c of the rotational barrel 13 is inserted into the corresponding rotation transmission groove 17c of the first cam barrel 17 via a corresponding introducing groove 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction 0 due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
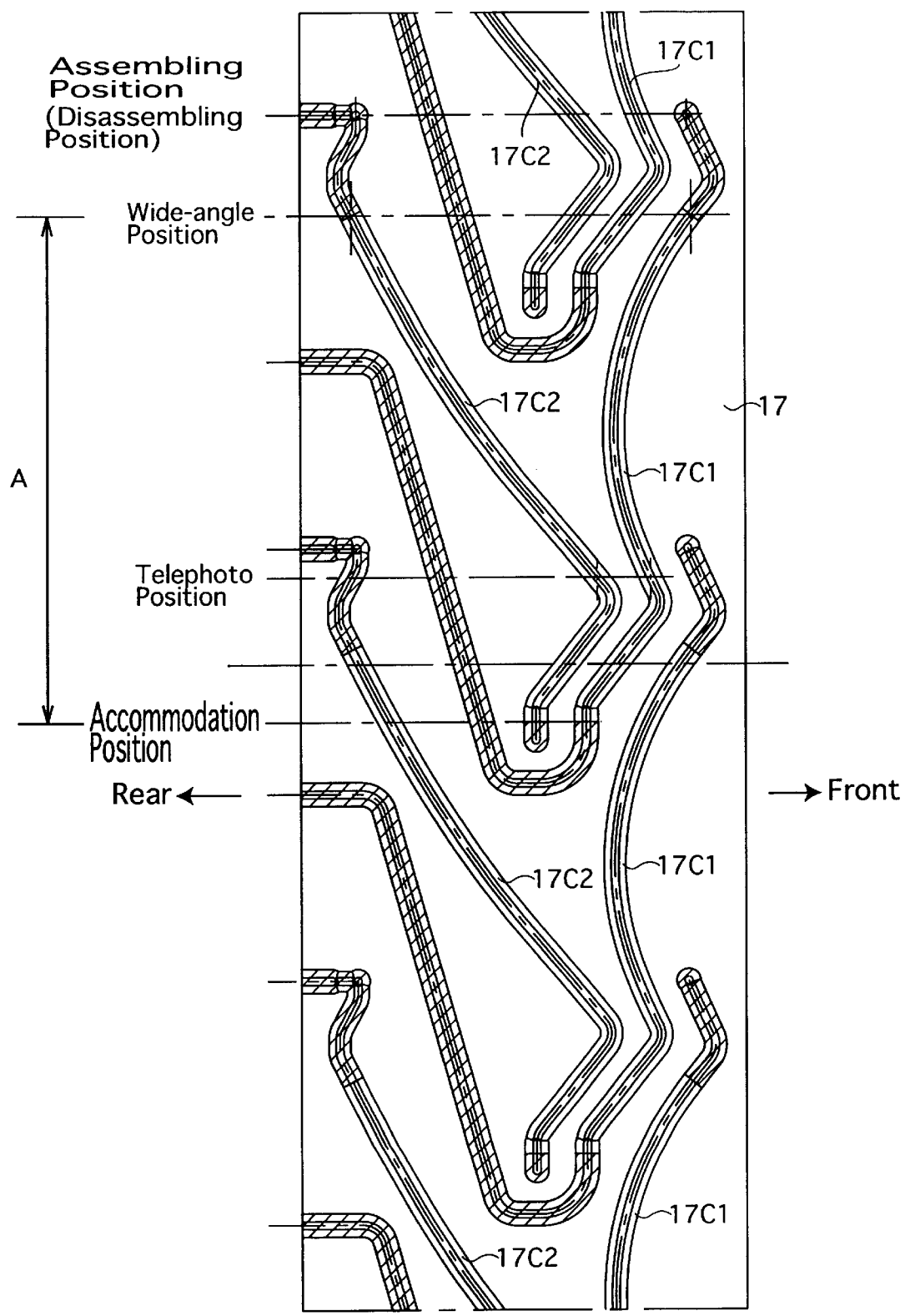
FIG. 3 is a developed view of the inner peripheral surface of a first cam barrel, showing the contours of first and second cam grooves formed on the inner peripheral surface of the first cam barrel.

The first cam barrel 17 is provided on an inner peripheral surface thereof with three first cam grooves 17C1 for driving the first lens group L1, and three second cam grooves 17C2 for driving the second lens group L2. FIG. 3 is a developed view of the inner peripheral surface of the first cam barrel 17, showing the contours of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17. Each of the first and second cam grooves 17C1 and 17C2 has three predetermined positions: an accommodation position, a telephoto position and a wide-angle, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups L1 and L2, respectively, when the power of the digital camera is turned OFF. The angle of rotation from the accommodation position to the wide-angle extremity position is shown by "A" in FIG. 3.

The zoom lens is provided with a first lens frame 22(L) and a second lens frame 23(L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection 22c which extends radially outwards to be fitted in the corresponding linear guide slot 16c in a slidable manner in the optical axis direction. Each resilient extending piece 22b is further provided on top of each square projection 22c with the follower pin 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f. A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17C2 in FIG. 3 are used solely for the purpose of inserting each follower pin 22d or 23d into the corresponding cam groove 17C1 or 17C2 during assembly, and thus are not used when the zoom lens is in operation.

According to the above described guide structure, rotating the rotational barrel 13 about the optical axis O causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O, but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
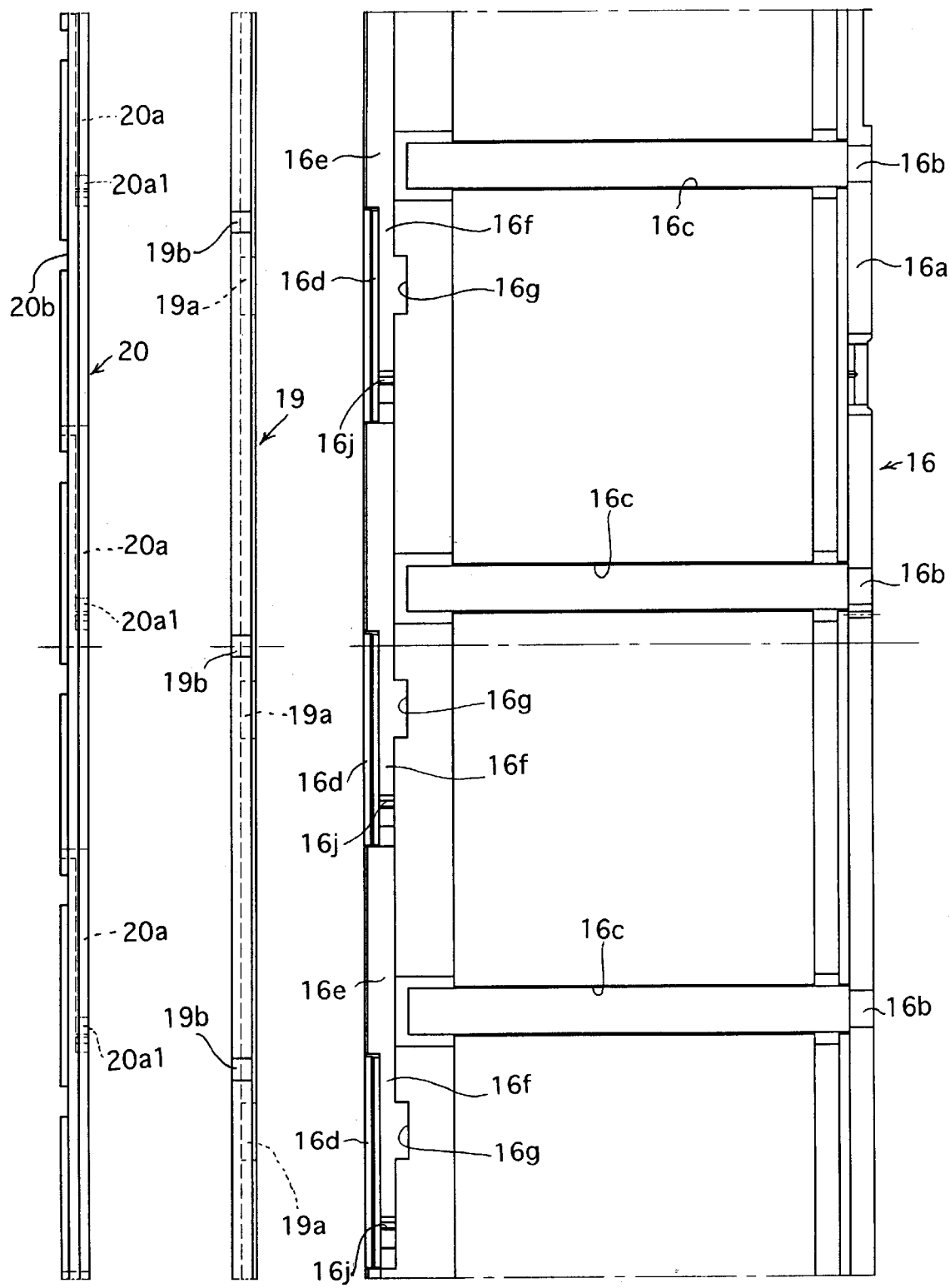
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards. A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16. Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detent 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel/linearly movable barrel) 25(L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins 25b which are respectively engaged with three guide grooves 18b formed on outer peripheral surface of the second cam barrel 18 at 120° intervals about the axis thereof.

Figure 8:
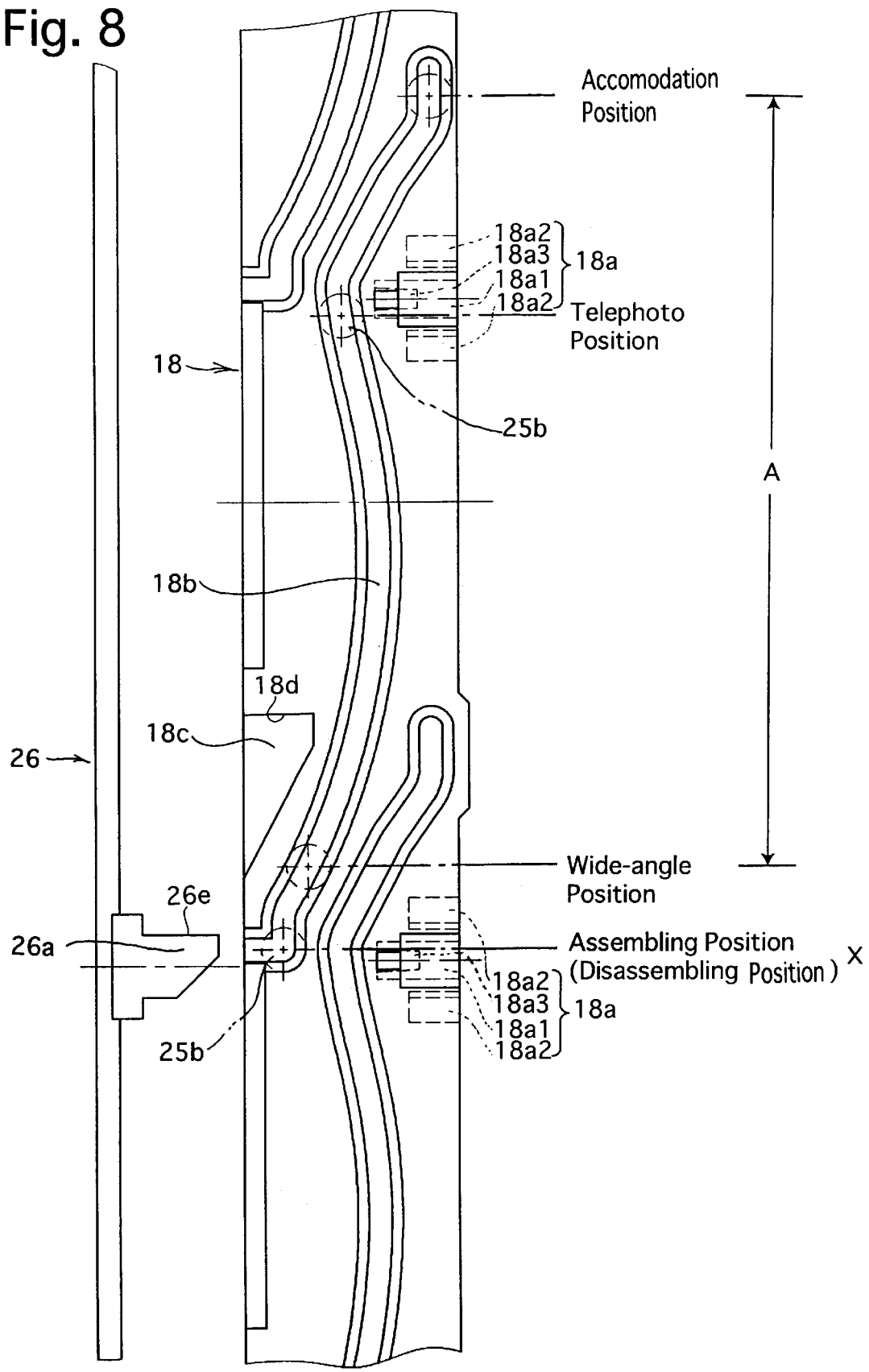
FIG. 8 is a developed view of a second cam barrel and a barrier drive ring, showing the positional relationship therebetween when the zoom lens is set at the telephoto extremity thereof (when the zoom lens is in a ready-to-photograph state)

As shown in FIG. 8, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam-barrel 17. More specifically, the three guide grooves 18b are formed to make the external barrel 25 function as a movable lens hood so that the external barrel 25 advances relative to the second cam barrel 18 (i.e., the first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29(F) designates a stationary external barrel which is integral with the camera body. The external barrel 25 advances and retreats with respect to the stationary external barrel 29.

Figure 13:
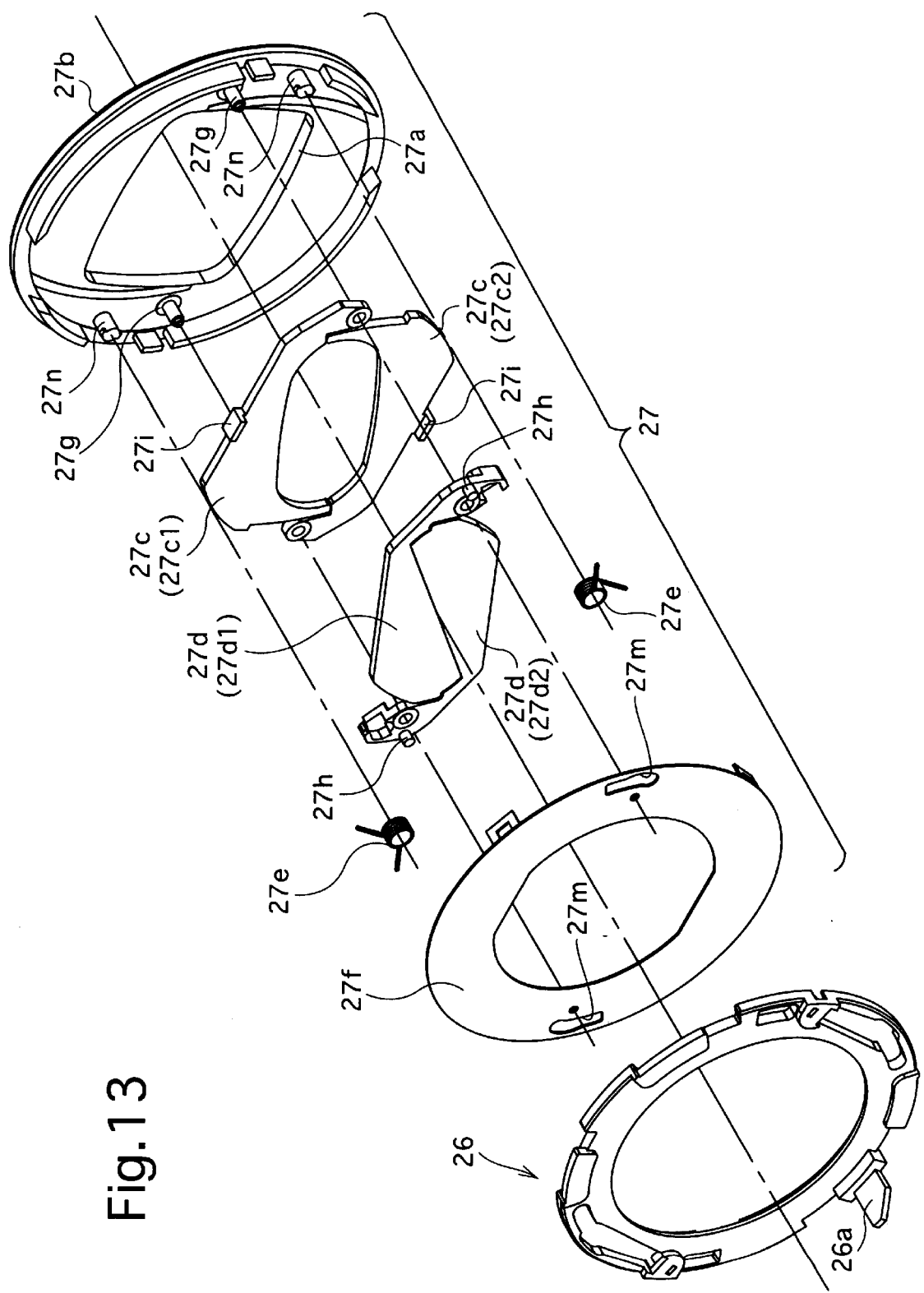
FIG. 13 is an exploded perspective view of the barrier block, viewed from behind the barrier block.
Figure 14:
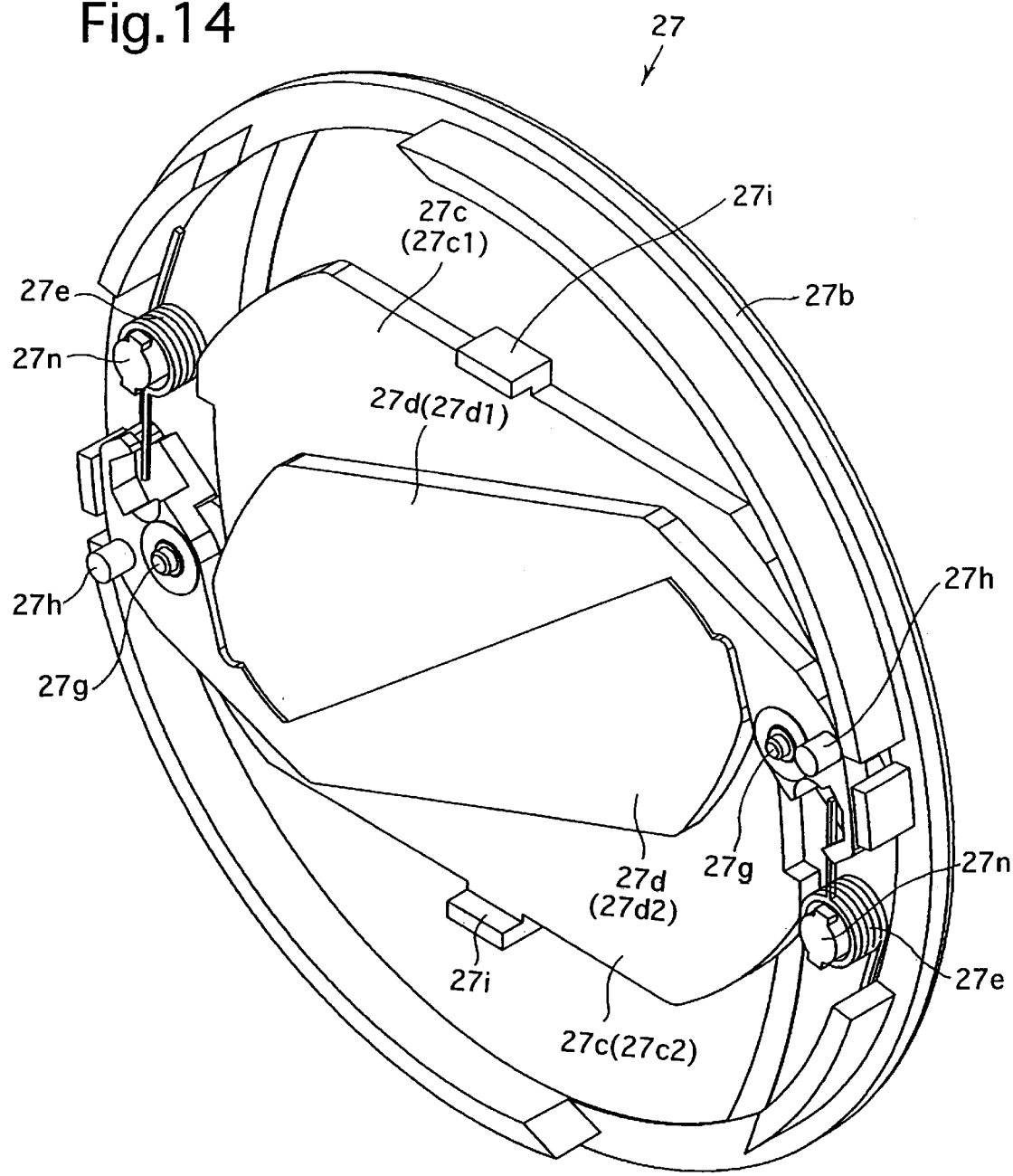
FIG. 14 is a perspective view of the barrier block with an annular pressure plate being removed from the barrier block, viewed from behind the barrier block.

The external barrel 25 is provided, at the front thereof in the radially inner side of the external barrel 25, with a barrier drive ring 26, so that the barrier drive ring 26 can rotate about the optical axis O. The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel (front end wall) 27b having a photographic aperture 27a, the aforementioned two pairs of barrier blades 27c and 27d supported by the panel 27b therebehind to open and close the photographic aperture 27a, and two torsion springs (second biasing device/closing biasing device/barrier biasing spring) 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27d1 of the rear pair of barrier blades 27d are pivoted at corresponding one of the two pivots 27g (the right pivot 27g as viewed in FIG. 13), while the lower front barrier blade 27c2 of the front pair of barrier blades 27c and the lower rear barrier blade 27d2 of the rear pair of barrier blades 27d are pivoted at the other pivot 27g (the left pivot 27g as viewed in FIG. 13). Each of the rear pair of barrier blades 27d is constantly biased to rotate in a direction to close the photographic aperture 27a of the panel 27b by the corresponding torsion spring 27e whose coil portion is fitted on the corresponding engaging pin 27n. Each of the rear pair of barrier blades 27d is provided in the vicinity of the pivoted portion thereof with a driven pin 27h that is driven to open the corresponding rear barrier blade 27d against the spring force of the corresponding torsion spring 27e. Each of the front pair of barrier blades 27c is provided on an outer edge thereof with an engaging projection 27i which extends rearward to be engaged with the outer edge of the corresponding rear barrier blade 27d so that the engaging projection 27i of each of the front pair of barrier blades 27c comes into engagement with the outer edge of the corresponding rear barrier blade 27d to rotate the corresponding front barrier blade 27c in the direction to open the photographic aperture 27a together with the corresponding rear barrier blade 27d when the corresponding rear barrier blade 27d is driven to rotate in the direction to open the photographic aperture 27a. The upper front barrier blade 27c1 is provided on a rear surface thereof with an engaging projection 27j, while the upper rear barrier blade 27d1 is provided on a front surface thereof with an engaging projection 27k (see FIGS. 15A, 15B and 15C). When the upper rear barrier blade 27d1 is driven to rotate in the direction to close the photographic aperture 27a, the engaging projection 27k of the upper rear barrier blade 27d1 is engaged with the engaging projection 27j of the upper front barrier blade 27c1 to drive the upper front barrier blade 27c1 to rotate in the direction to close the photographic aperture 27a together with the upper rear barrier blade 27d1. Likewise, the lower front barrier blade 27c2 is provided on a rear surface thereof with an engaging projection 27j, while the lower rear barrier blade 27d2 is provided on a front surface thereof with an engaging projection 27k (see FIGS. 15A, 15B and 15C). When the lower rear barrier blade 27d2 is driven to rotate in the direction to close the photographic aperture 27a, the engaging projection 27k of the lower rear barrier blade 27d2 is engaged with the engaging projection 27j of the lower front barrier blade 27c2 to drive the lower front barrier blade 27c2 to rotate in the direction to close the photographic aperture 27a together with the lower rear barrier blade 27d2.

The pressure plate 27f is provided with two slots 27m through which the two drive pins 27h of the rear pair of barrier blades 27d penetrate toward the barrier drive ring 26, respectively.

Figure 16:
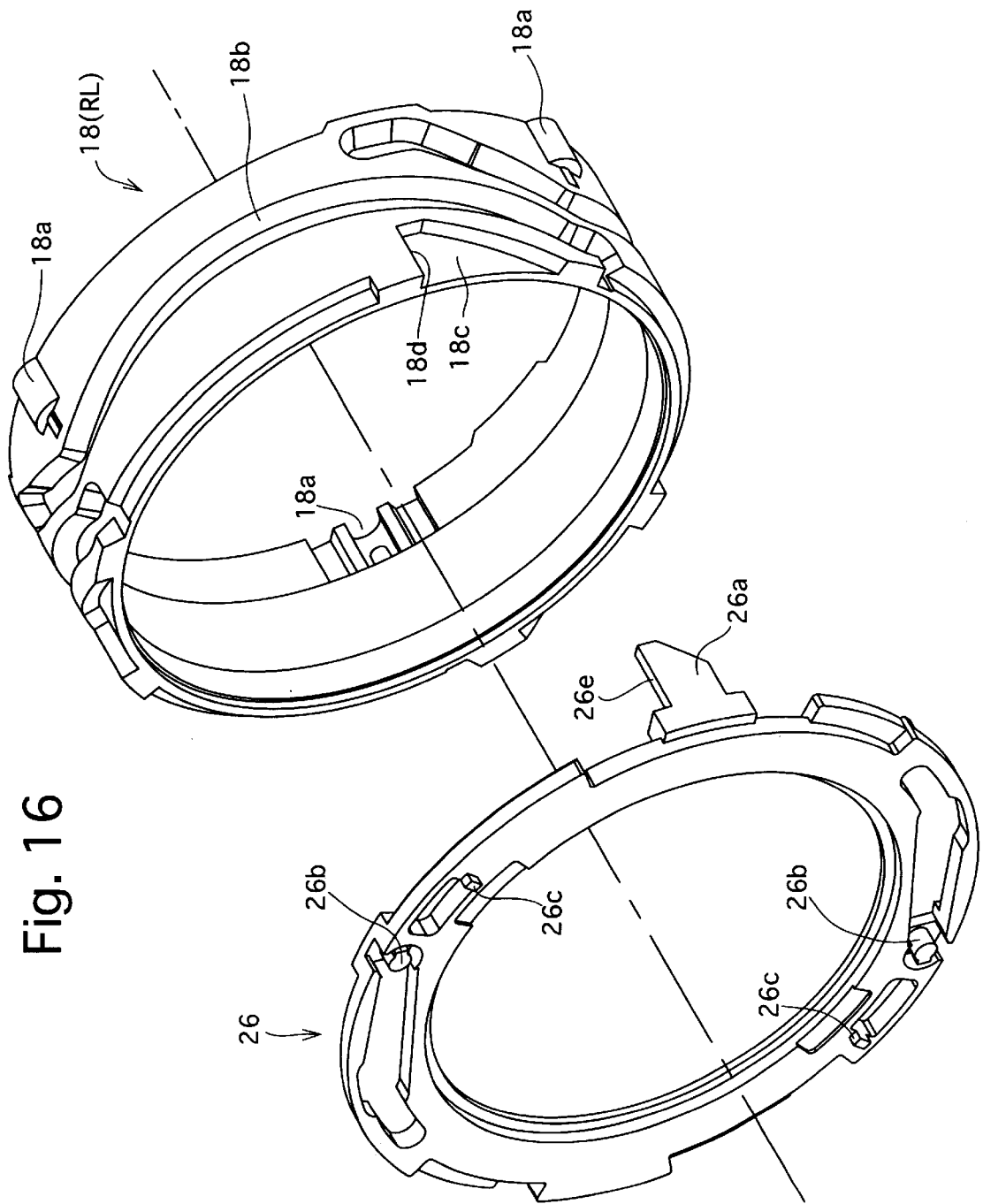
FIG. 16 is a perspective view of the second cam barrel and the barrier drive ring, showing the positional relationship between a driven lever which extends from the barrier drive ring and a rotation transfer recess formed on the second cam barrel.

The barrier drive ring 26 is provided on the front thereof with two protrusions 26b, while the external barrel 25 is provided in the vicinity of the front end thereof with corresponding two protrusions 25c (see FIGS. 16, 17 and 18). Two helical extension springs (biasing device/opening biasing device/ring biasing springs) 28 are positioned between the external barrel 25 and the barrier drive ring 26 so that one and the other ends of one helical extension spring 28 are hooked on one of the two protrusions 26b and corresponding one of the two protrusions 25c, respectively, and one and the other ends of the other helical extension spring 28 are hooked on the other protrusion 26b and the other protrusion 25c, respectively. The spring force of each helical extension spring 28 is stronger than the spring force of each torsion spring 27e. The barrier drive ring 26 is constantly biased by the two helical extension springs 28 to rotate in the direction to open the two pairs of barrier blades 27c and 27d. The barrier drive ring 26 is provided on the front thereof with two protrusions (engaging portions) 26c which can be respectively engaged with the two drive pins 27h of the rear pair of barrier blades 27d to open the two pairs of barrier blades 27c and 27d. When the barrier drive ring 26 is rotated to the rotational limit thereof by the spring force of the helical extension springs 28, each of the two protrusions 26c is engaged with the corresponding driven pin 27h to push the same in the direction to open the corresponding rear barrier blade 27d against the spring force of the corresponding torsion spring 27e, so that the corresponding front barrier blade 27c also opens via the engaging projection 27i thereof (see FIGS. 15A, 15B and 15C).

Figure 9:
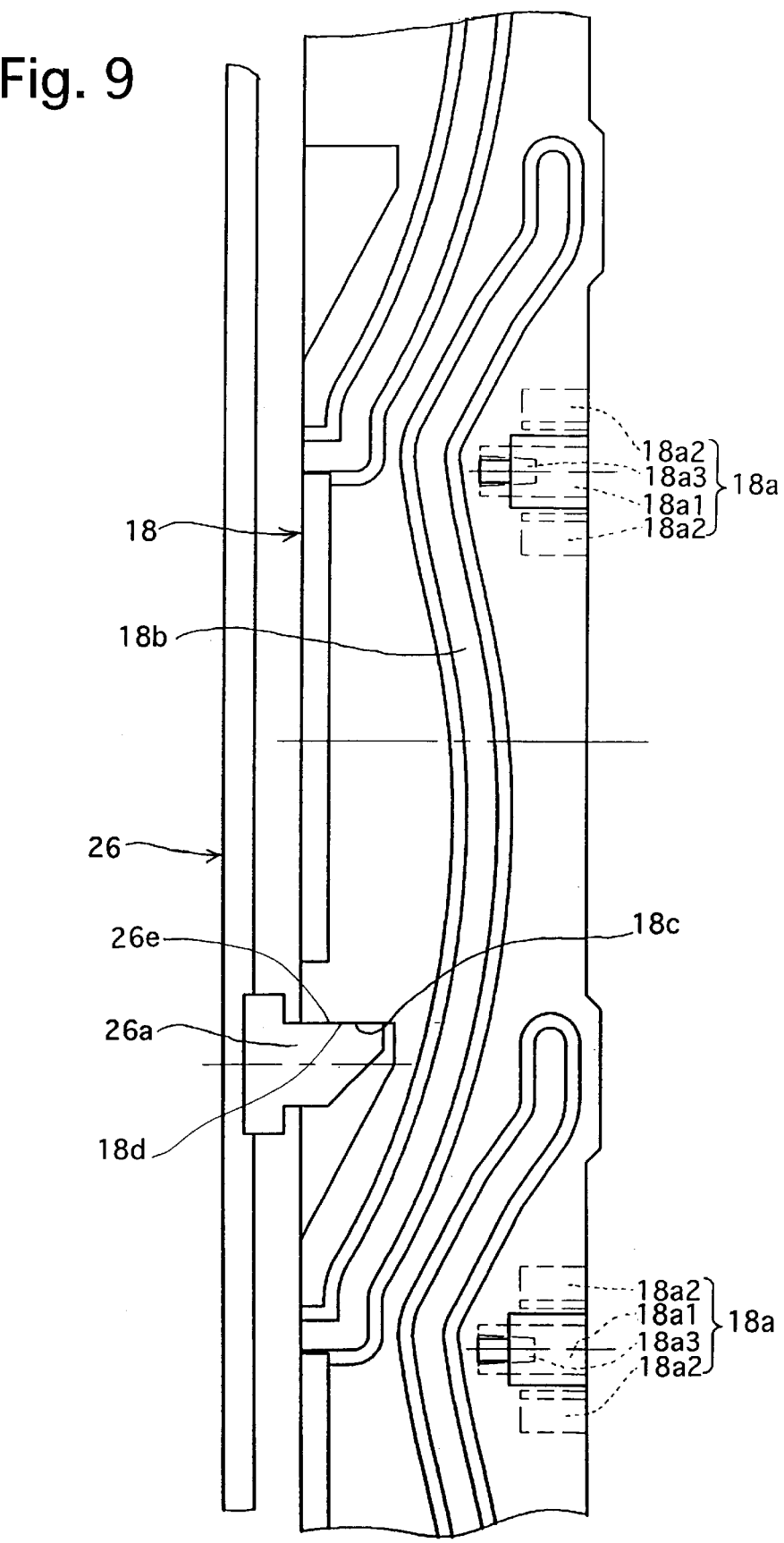
FIG. 9 is a developed view of the second cam barrel and the barrier drive ring, showing the positional relationship therebetween when the zoom lens is positioned in the accommodation position (when the power of the zoom lens is turned OFF)

On the other hand, the barrier drive ring 26 is provided with a driven lever 26a which extends from the rim of the barrier drive ring 26 toward the second cam barrel 18 to be engaged with, and disengaged from, a rotation transfer recess 18c formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25b of the external barrel 25 with the guide grooves 18b of the second cam barrel 18 as can be seen in FIGS. 8 and 9. The driven lever 26a and the rotation transfer recess 18c are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26a approaches the rotation transfer recess 18c and is then engaged with the rotation transfer recess 18c to apply a force to the barrier drive ring 26 to rotate the same in the direction to close the two pairs of barrier blades 27c and 27d. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a (see FIG. 14). Conversely, when the zoom barrel advances from the accommodation position thereof to the telephoto extremity thereof the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, each of the protrusions 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d. Accordingly, as can be understood by the above description, the two pairs of barrier blades 27c and 27d are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
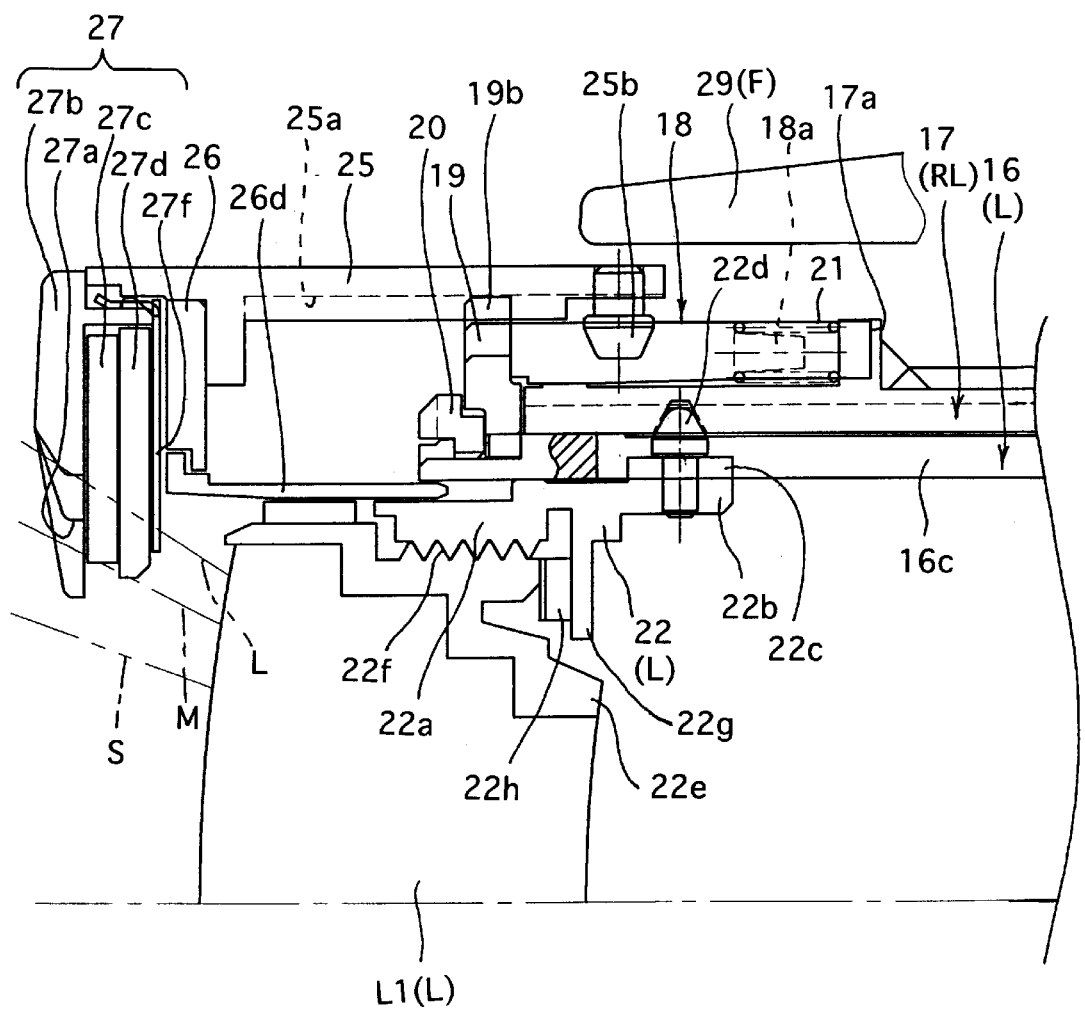
FIG. 10 is an axial cross sectional view of the zoom lens show in FIG. 1, showing the zoom lens above the optical axis thereof, showing the positional relationship between an external barrel and the second cam barrel (a first lens group) when the zoom lens is set at the wide-angle extremity thereof.
Figure 11:
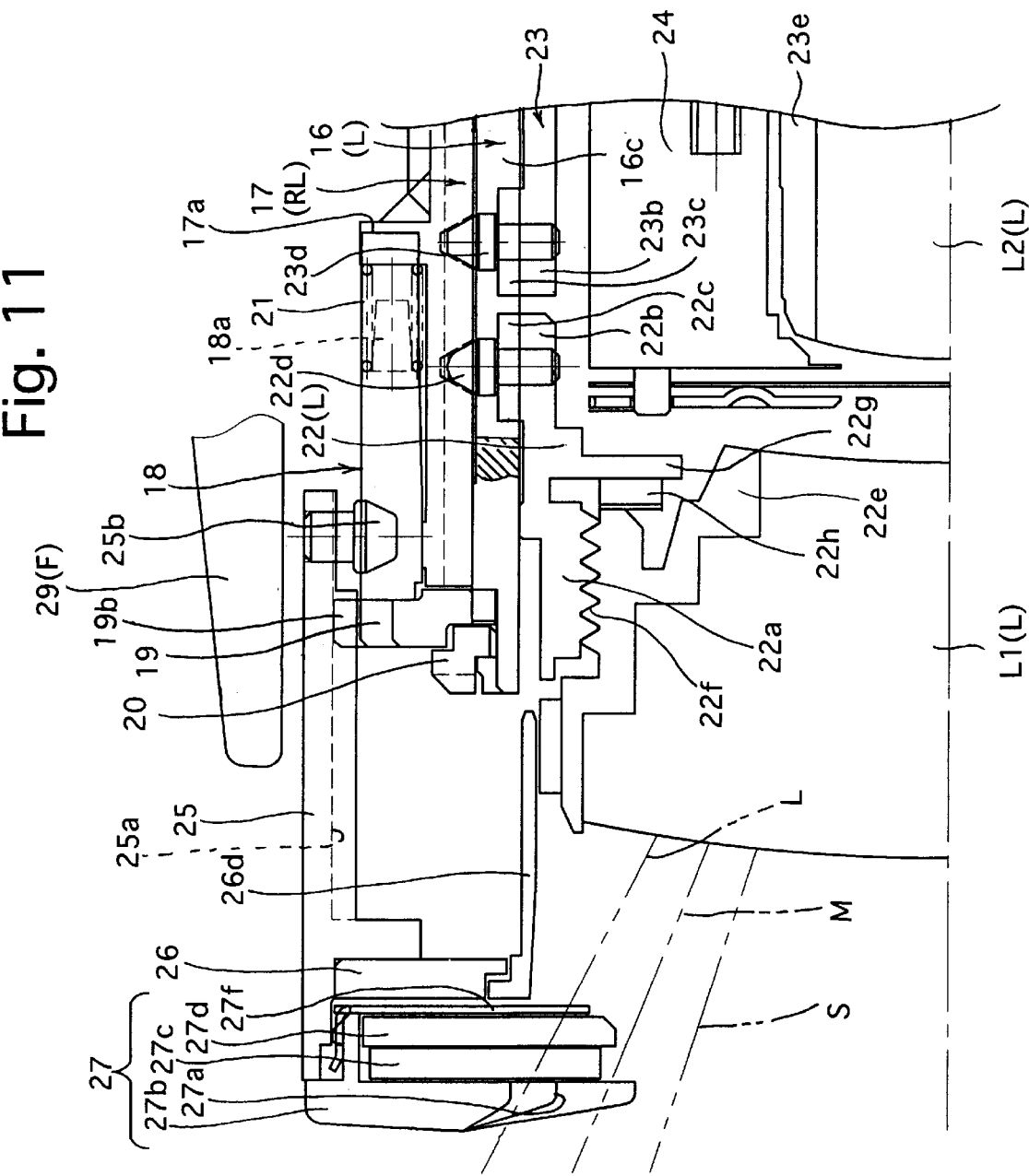
FIG. 11 is an axial cross sectional view of the zoom lens show in FIG. 1, showing the zoom lens above the optical axis thereof, and showing the positional relationship between the external barrel and the second cam barrel (the first lens group) when the zoom lens is set at the telephoto extremity thereof.
Figure 12:
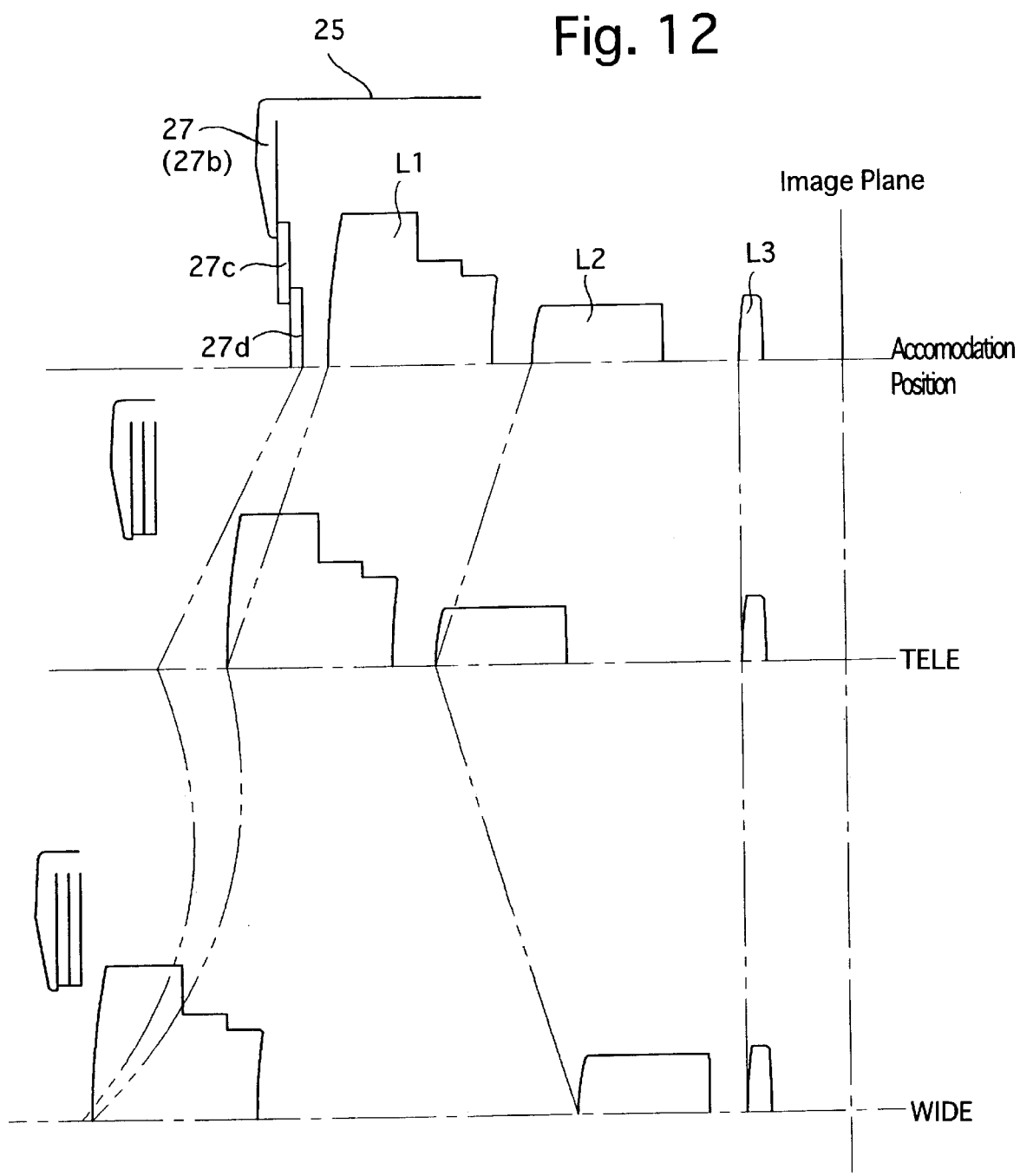
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically, the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12. The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the front most lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

The two pairs of barrier blades 27c and 27d are driven to open and close by rotation of the barrier drive ring 26, which is rotatably supported by the external barrel (linearly movable barrel) 25, from one limit of rotation of the barrier drive ring 26 to the other rotational limit thereof.

When the zoom lens is in a photographing position within the photographing range between the telephoto extremity and the wide-angle extremity, the driven lever 26a of the barrier drive ring 26 and the rotation transfer recess 18c of the second cam barrel (rotational barrel/movable member) 18 are apart from each other, and at the same time, the barrier drive ring 26 is biased to be held at one rotational end thereof to fully open the two pairs of barrier blades 27c and 27d by the two helical extension springs (biasing device/opening biasing device/ring biasing springs) 28, which are positioned between the external barrel 25 and the barrier drive ring 26. In this state, the two pairs of barrier blades 27c and 27d are acted upon by the spring force of the two torsion springs (second biasing device/closing biasing device/barrier biasing spring) 27e, which constantly bias the two pairs of barrier blades 27c and 27d in a direction to close the photographic aperture 27a, respectively. However, since the spring force of the helical extension springs 28 is greater than the spring force of the torsion springs 27e, each of the protrusions (engaging portions) 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d.

When the zoom barrel retreats from a photographing position, within a photographing range between the telephoto extremity and the wide-angle extremity, to the accommodation position, the driven lever 26a approaches the rotation transfer recess 18c and is then engaged with the rotation transfer recess 18c to apply a force to the barrier drive ring 26 to rotate the same in a direction to close the two pairs of barrier blades 27c and 27d as shown in FIG. 9. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a.

Accordingly, the rotational driving force for rotating the barrier drive ring 26 in a direction to close the two pairs of barrier blades 27c and 27d against the spring force of the helical extension springs 28 is applied to the barrier drive ring 26 from the second cam barrel 18, which rotates in the same rotational direction as the barrier drive ring 26. As shown in FIGS. 8, 9 and 16, the rotation transfer recess 18c is formed on the second cam barrel 18 so that an engaging surface (rotational-force transmission surface) 18d of the rotation transfer recess 18c, which can be engaged with a corresponding engaging surface (rotational-force receiving surface) 26e of the driven lever 26a to receive rotational driving force from the barrier drive ring 26, extends in the optical axis direction, while the driven lever 26a is formed on the barrier drive ring 26 so that the engaging surface 26e of the driven lever 26a extends in the optical axis direction. Namely, both the engaging surface 18d of the rotation transfer recess 18c and the engaging surface 26e of the driven lever 26a are formed parallel to the optical axis O, so that the rotational driving force for rotating the barrier drive ring 26 in a direction to close the two pairs of barrier blades 26 against the spring force of the helical extension springs 28 is given to the barrier drive ring 26 from the second cam barrel 18 without substantial energy loss.

In the case of driving the barrier blades 27c and 27d of the lens barrier 27 to open or close by utilizing a movement of a movable member of a lens barrel, if the movement of the movable member can be transmitted to the barrier blades without substantial energy loss, the operational performance of the lens barrier can eventually be improved without adversely affecting the performance of the advancing/retreating operation of the movable barrel of the zoom lens. The reason for this will be hereinafter discussed in detail.

When the barrier drive ring 26 is driven to rotate about the optical axis O against the spring force of the helical extension springs 28, the helical extension springs 28 having a large spring force can be used with a structure which makes it possible to transmit a movement of a movable member of the zoom lens barrel to the barrier drive ring 26 with minimum energy loss on condition that the force of movement of the movable member is constant because such a structure makes the rotational driving force which is applied to the barrier drive ring 26 large. As the spring force of the helical extension springs 28 becomes greater, the driving force for opening the two pairs of barrier blades 27c and 27d becomes greater.

If the spring force of the helical extension springs 28 is large, the two pairs of barrier blades 27c and 27d can open quickly rapidly with reliability. For instance, since the biasing force by the helical extension spring 28 for biasing the barrier drive ring 26 in a direction to open the rear pair of barrier blades 27d acts upon each drive pin 27h thereof positioned in the vicinity of the associated pivot 27g, if the spring force of the helical extension springs 28 is weak, there is a possibility of the two pairs of barrier blades 27c and 27d not fully opening in the case where foreign matter is caught on the rear pair of barrier blades 27d in the vicinity of the free rotational ends of the barrier blades 27d away from the pivots 27g. However, this problem can be easily overcome if only the helical extension springs 28 having a large spring force are used.

Furthermore, if the helical extension springs 28 having a large spring force are used, the torsion springs 27e each having a large spring force can be used because the spring force of the torsion springs 27e is determined in accordance with the spring force of the helical extension springs 28 (the spring force of the helical extension springs 28 is greater than the spring force of the torsion springs 27e). Similar to the helical extension springs 28, if the spring force of each torsion spring 27e is large, the two pairs of barrier blades 27c and 27d can close quickly rapidly with reliability.

Accordingly, the operational performance of the lens barrier (the two pairs of barrier blades 27c and 27d) can be improved by using springs (the torsion springs 27e and the helical extension springs 28) having a large spring force. The driving force necessary for driving the lens barrier needs to be large if the springs (the torsion springs 27e and the helical extension springs 28) have a large spring force. However, if a movement of the movable member (second cam barrel 18) of the zoom lens barrel can be transmitted to the barrier drive ring with minimum energy wastage (like as in the present embodiment of the lens barrier opening/closing device), the barrier drive ring can be driven to rotate by a normal force of movement of the movable member moving from a photographing position to the accommodation position. Consequently, the lens barrier can be driven with reliability without deteriorating the performance of the advancing/retreating operation of the movable lens barrel, and without imposing excessive load on the drive source for the movable lens barrel.

As shown in FIG. 8, when the zoom lens barrel advances from the accommodation position to a photographing position, the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, the engaging surface 26e of the driven lever 26a and the engaging surface 18d of the rotation transfer recess 18c do not overlap each other in the optical axis direction. The present embodiment of the photographing lens is a zoom lens in which the barrier drive ring 26 (the external barrel 25) and the second cam barrel 18 rotate about the optical axis O relative to each other to perform a zooming operation between the telephoto extremity and the wide-angle extremity. Due to this structure of the zoom lens, the barrier drive ring 26 and the second cam barrel 18 are preferably apart from each other in the optical axis direction so that the driven lever 26a, which projects toward the second cam barrel 18 in the optical axis direction, does not overlap the second cam barrel 18 in the optical axis direction to prevent rotation of the external barrel 25 from interfering with rotation of the second cam barrel 18 when the zoom lens is in a photographing position between the telephoto extremity and the wide-angle extremity.

As can be understood by the above description, in the present embodiment of the lens barrier opening/closing device, the rotational force of a rotational barrel (the second cam barrel 18) of a lens barrel is transmitted to the barrier drive ring with minimum energy wastage, the lens barrier is driven reliably without deteriorating the performance of the advancing/retreating operation of the zoom lens, while improving the operational performance of the lens barrier.

On the other hand, the helical extension springs 28, which bias the barrier drive ring 26 to rotate in the direction to open the two pairs of barrier blades 27c and 27d, are arranged on opposite sides with respect to the optical axis O in a radial direction (see FIGS. 1, 17 and 18). The barrier drive ring 26 is provided thereon with the two protrusions (second protrusions) 26b, while the external barrel 25, which supports the barrier drive ring 26 so that the barrier drive ring 26 can rotate about the optical axis O, is also provided in the vicinity of the front end of the external barrel 25 with the two protrusions (first protrusions) 25c. Accordingly, the two helical extension springs 28, which are each hooked at opposite ends thereof over the corresponding protrusions 25c and 26b, are arranged on opposite sides with respect to the optical axis O in a radial direction. This arrangement of the two helical extension springs 28 keeps a balance of the biasing force which acts upon the barrier drive ring 26 by the two helical extension springs 28. This is effective in preventing the rotational center of the barrier drive ring 26 from being eccentric from the optical axis O.

The barrier drive ring 26 drives the rear pair of barrier blades 27d by bringing the two protrusions 26c, which are formed on the barrier drive ring 26 at different positions in a circumference of the barrier drive ring 26, into engagement with the corresponding driven pins 27h. Due to this structure, if the barrier block 27 is provided with only one helical extension spring 28, there is a possibility of the rotational center of the barrier drive ring 26 being eccentric from the optical axis O, so that the driving force of the barrier drive ring 26 which is to be exerted uniformly on the two protrusions 26c would incline toward one of the two protrusions 26c. If this happens, because the driving force exerted on the other protrusion 26c is insufficient, the associated upper or lower rear barrier blade 27d1 or 27d2 does not fully open and therefore stops at an incomplete open position when the barrier drive ring 26 rotates toward one rotational end thereof to open the two pairs of barrier blades 27c and 27d by the spring force of the helical extension springs 28. If the upper or lower rear barrier blade 27d1 or 27d2 stops at an incomplete open position, the corresponding upper or lower front barrier blade 27c1 or 27c2 also stops at an incomplete open position.

On the other hand, if the rotational center of the barrier drive ring 26 deviates from the optical axis O, there is a possibility of either protrusion 26c of the barrier drive ring 26 incompletely disengaging from the corresponding driven pin 27h when the barrier drive ring 26 rotates toward the other rotational end thereof to close the two pairs of barrier blades 27c and 27d against the spring force of the helical extension springs 28. If this happens, the associated upper or lower rear barrier blade 27d1 or 27d2 and also the associated upper and lower rear barrier blade 27c1 or 27c2 do not fully close and therefore each barrier blade stops at an incomplete closed position.

On the contrary, according to the present embodiment of the lens barrier opening/closing device in which the two helical extension springs 28 that bias the barrier drive ring 26 are arranged on opposite sides of the optical axis O in a radial direction, the rotational center of the barrier drive ring 26 is prevented from being eccentric from the optical axis O, so that the driving force of the barrier drive ring 26 is exerted on the two protrusions 26c uniformly via the two protrusions 26c. Consequently, the two pairs of barrier blades 27c and 27d are driven to open and close with reliability.

Specifically, in the present embodiment of the lens barrier opening/closing device, the upper front barrier blade 27c1 of the front pair of barrier blades 27c and the upper rear barrier blade 27d1 of the rear pair of barrier blades 27d are pivoted at corresponding one of the two pivots 27g, the lower front barrier blade 27c2 of the front pair of barrier blades 27c and the lower rear barrier blade 27d2 of the rear pair of barrier blades 27d are pivoted at the other pivot 27g, and the rear pair of barrier blades 27d are constantly biased to rotate in directions to close the photographic aperture 27a of the panel (front end wall) 27b by the two torsion springs 27e, respectively, which are arranged on opposite sides of the rear pair of barrier blades 27d in a radial direction. Due to this structure, since the barrier drive ring 26 is biased by the two torsion springs 27e in the direction opposite to the biasing direction of the two helical extension springs 28, two helical extension springs 28 are required to bias the barrier drive ring 26 with a large biasing force relative to the biasing force of the two torsion springs 27e.

If it is herein assumed that only one of the two helical extension springs 28 is required to bias the barrier drive ring 26 with a large biasing force, the rotational center of the barrier drive ring 26 can deviate easily from the optical axis O since the biasing force by the two helical extension springs 28 will not uniformly act upon the barrier drive ring 26.

According to the present embodiment of the lens barrier opening/closing device, the arrangement wherein the two helical extension springs 28 are provided to correspond to the two torsion springs 27e keeps a balance of the biasing force which acts upon the barrier drive ring 26 by the two helical extension springs 28, which prevents the rotational center of the barrier drive ring 26 from being eccentric from the optical axis O.

In a lens barrier opening/closing device which utilizes spring force to open and close the barrier blades 27c and 27d, the barrier blades 27c and 27d can be reliably opened and closed with springs each having a large spring force for biasing the barrier drive ring or the barrier blades. However, if there is only one spring for biasing the barrier drive ring, a possibility of the rotational center of the barrier drive ring 26 being eccentric from the optical axis becomes higher as the spring force of the spring is greater as noted above, so that the spring having a large spring force cannot be used to bias the barrier drive ring.

Conversely, in the present embodiment of the lens barrier opening/closing device, even if each of the two helical extension springs 28 has a large spring force, there is no possibility of the rotational center of the barrier drive ring 26 being eccentric from the optical axis as long as the biasing force by the two helical extension springs 28 uniformly acts upon the barrier drive ring 26. The spring force of the two torsion springs 27e, which bias the rear pair of barrier blades 27d in a direction to close the photographic aperture 27a, is determined in accordance with the spring force of the two helical extension springs 28 so that the spring force of the two torsion springs 27e is smaller than that of the two helical extension springs 28. Therefore, if the spring force of the two helical extension springs 28 is large, the two torsion springs 27e having a strong spring force can be used. Namely, the arrangement wherein the helical extension springs 28 are arranged on opposite sides with respect to the optical axis O in a radial direction with the use of springs each having a large spring force improves the operational performance of the lens barrier.

As can be understood by the above description, in the present embodiment of the lens barrier opening/closing device according to the present invention, the barrier blades can be driven to open and close with reliability due to the arrangement wherein two springs, which bias the barrier drive ring to rotate in a direction to open the barrier blades, are arranged on opposite sides with respect to the optical axis in a radial direction.

The present invention is not limited solely to the above illustrated embodiment.

For instance, although the lens barrier opening/closing device is incorporated in a zoom lens in the above illustrated embodiment, the lens barrier opening/closing device can be incorporated in a normal lens having a fixed focal length as long as the lens barrel moves between an accommodation position thereof and a photographing position thereof.

In the present embodiment of the lens barrier opening/closing device according to the present invention, the barrier drive ring 26 is constantly biased in a direction to open the pair of barrier blades 27c and 27d by springs (torsion springs 27e), while the barrier drive ring 26 is biased in the opposite direction to close the barrier blades against the spring force by a strong driving force given to the barrier drive ring 26 from the second cam barrel 18 only when the zoom lens barrel is in the accommodation position. The reason why this structure has been adopted is that it is not practical to make the barrier drive ring 26 and the second cam barrel 18 remain engaged with each other in the photographing position between the telephoto extremity and the wide-angle extremity because of the structure of the zoom lens wherein the barrier drive ring 26 and the second cam barrel 18 rotate about the optical axis relative to each other and move in the optical axis direction relative to each other in the photographing position between the telephoto extremity and the wide-angle extremity.

However, from the aforementioned view point of transmitting a movement of a rotational barrel (second cam barrel 18) of the zoom lens barrel to the barrier blades without energy loss, the relationship between the direction of biasing the barrier drive ring 26 to open the two pairs of barrier blades 27c and 27d and the direction of force of movement given to the barrier drive ring 26 by the rotational barrel (the second cam barrel 18) against the biasing force exerted on the barrier drive ring 26 can be reversed relative to the relationship in the present embodiment. Namely, in theory, the barrier drive ring 26 and the rotational barrel (the second cam barrel 18) can be made to be disengaged from each other with the barrier blades being fully closed by a biasing device which biases the barrier drive ring when the zoom lens is in the accommodation position, while the barrier drive ring and the rotational barrel can be made to be engaged with each other to rotate the barrier drive ring in a direction to open the barrier blades against the biasing force when the zoom lens advances from the accommodation position to the photographing position. In this case, the biasing device for biasing the barrier blades which corresponds to the torsion springs 27e of the above illustrated embodiment is adapted to bias the barrier blades to open, contrary to the biasing direction of the torsion springs 27e of the above illustrated embodiment.

In the present embodiment of the lens barrier opening/closing device according to the present invention, the barrier drive ring 26 is constantly biased in a direction to open the barrier blades by the two helical extension springs 28, while the barrier drive ring 26 is biased in the opposite direction to close the barrier blades against the spring force by a strong driving force given to the barrier drive ring 26 from the second cam barrel 18 only when the zoom lens barrel is in the accommodation position.

However, the relationship between the direction of biasing the barrier drive ring 26 to open the two pairs of barrier blades 27c and 27d by the two helical extension springs 28 and the direction of force of movement applied to the barrier drive ring 26 by the second cam barrel 18 against the biasing force exerted on the barrier drive ring 26 can be reversed. Namely, the barrier drive ring 26 and the rotational barrel (second cam barrel 18) can be made to disengage from each other with the barrier blades 27c and 27d being fully closed by a biasing device which biases the barrier drive ring 26 when the zoom lens is in the accommodation position, while the barrier drive ring 26 and the rotational barrel (second cam barrel 18) can be made to engage with each other to rotate the barrier drive ring 26 in a direction to open the barrier blades 27c and 27d against the biasing force when the zoom lens advances from the accommodation position to the photographing position. In this case, a faulty operation in which the barrier blades 27c and 27d do not fully open or close when the zoom lens is in the photographing position and the accommodation position, respectively, can be prevented from occurring if only a deviation of the rotational center of the barrier drive ring 26 from the optical axis can be prevented from occurring by arranging two springs for biasing the barrier drive ring 26 on opposite sides of the barrier blades 27c and 27d in a radial direction. In this case, the biasing device for biasing the barrier blades 27c and 27d which corresponds to the torsion springs 27e of the above illustrated embodiment is adapted to bias the barrier blades 27c and 27d open, contrary to the biasing direction of the torsion springs 27e of the above illustrated embodiment.

As can be understood from the foregoing, according to the present invention, a lens barrier opening/closing apparatus with which the lens barrier operates with reliability without deteriorating the operational performance of the movable lens barrel can be obtained. Moreover, a lens barrier opening/closing apparatus which prevents the rotational center of the barrier drive ring from being eccentric from the optical axis of the photographic optical axis so that the lens barrier operates with reliability can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrier opening/closing device of a movable lens barrel driven to move between an accommodation position and a photographing position, comprising:
    at least one barrier blade which is driven to open and close a photographic aperture formed at the front end wall of said movable lens barrel when said movable lens barrel is in said photographing position and said accommodation position, respectively;
    a barrier drive ring driven to rotate about an optical axis to drive said at least one barrier blade;
    a first biasing device which biases said barrier drive ring in a predetermined rotational direction;
    a rotational barrel which at least rotates about said optical axis when said movable lens barrel moves between said accommodation position and said photographing position;
    a rotational-force receiving surface formed on said barrier drive ring, said rotational force receiving surface extending parallel to said optical axis; and
    a rotational-force transmission surface formed on said rotational barrel, said rotational-force transmission surface extending parallel to said optical axis,
    wherein said rotational-force receiving surface and said rotational-force transmission surface are engaged with each other to rotate said barrier drive ring together with said rotational barrel about said optical axis in a direction against a biasing force of said first biasing device when said movable lens barrel moves from one of said photographing position and said accommodation position to the other of said photographing position and said accommodation position.

2. The lens barrier opening/closing device according to claim 1, wherein said barrier drive ring comprises a drive lever which extends substantially parallel to the optical axis toward said rotational barrel, said drive lever including said rotational-force receiving surface thereon.

3. The lens barrier opening/closing device according to claim 2, wherein said rotational barrel comprises a recess formed to allow said drive lever to enter said recess, said rotational-force transmission surface being formed as a wall of said recess.

4. The lens barrier opening/closing device according to claim 1, wherein said movable lens barrel is an element of a zoom lens of a camera.

5. The lens barrier opening/closing device according to claim 1, wherein said first biasing device comprises at least one helical extension spring.

6. The lens barrier opening/closing device according to claim 1, wherein said barrier drive ring and said rotational barrel rotate relative to each other about said optical axis and move relative to each other in a direction of said optical axis when said movable lens barrel moves between said photographing position and said accommodation position, and wherein said barrier drive ring and said rotational barrel are apart from each other so that said rotational-force receiving surface and said rotational-force transmission surface do not overlap each other in said direction of said optical axis when said movable lens barrel is in a specific one of said photographing position and said accommodation position in which said rotational barrel does not drive said barrier drive ring to rotate about said optical axis via said rotational-force receiving surface and said rotational-force transmission surface.

7. The lens barrier opening/closing device according to claim 6, further comprising:

a linearly movable barrel positioned around said rotational barrel, guided in said direction of said optical axis without rotating about said optical axis, and supporting said barrier drive ring in a front end of said linearly movable barrel so that said barrier drive ring is rotatable about said optical axis;

a radially inward pin formed on said linearly movable barrel to extend radially inwards; and a guide groove, corresponding to said radially inward pin, formed on an outer peripheral surface of said rotational barrel to be engaged with said radially inward pin to move said linearly movable barrel in said direction of said optical axis by rotation of said rotational barrel.

8. The lens barrier opening/closing device according to claim 7, wherein said movable lens barrel is an element of a zoom lens of a camera, and wherein said linearly movable barrel functions as a movable lens hood which advances relative to said rotational barrel when said zoom lens is set at a telephoto extremity thereof having a narrow angle of view, and which retreats relative to the rotational barrel when said zoom lens is set at a wide-angle extremity thereof having a wide angle of view.

9. The lens barrier opening/closing device according to claim 1, further comprising:

a second biasing device which biases said barrier blade in a direction toward one of an open position and a closed position of said barrier blade against the biasing force of said first biasing device, a biasing force of said second biasing device being smaller than that of said first biasing device, wherein said barrier blade is driven by said biasing force of said second biasing device when said barrier drive ring is driven to rotate against said biasing force of said first biasing device by rotation of said rotational barrel.

10. The lens barrier opening/closing device according to claim 9, wherein said second biasing device comprises at least one torsion spring.

11. A lens barrier opening/closing device of a movable lens barrel, comprising:

at least one barrier blade which is driven to open and close a photographic aperture formed at the front end wall of said movable lens barrel;

a rotational barrel which at least rotates about an optical axis when said movable lens barrel moves between an accommodation position and a photographing position;

a barrier drive ring driven to rotate about said optical axis to drive said barrier blade;

an opening biasing device which biases said barrier drive ring in a direction to open said barrier blade;

a rotational-force receiving surface formed on said barrier drive ring, said rotational-force receiving surface extending parallel to said optical axis; and a rotational-force transmission surface formed on said rotational barrel, said rotational-force transmission surface extending parallel to said optical axis, wherein said rotational-force receiving surface and said rotational-force transmission surface are engaged with each other to rotate said barrier drive ring about said optical axis in a direction to close said barrier blade against said biasing force of said opening biasing device while said rotational barrel rotates when said movable lens barrel moves from said photographing position to said accommodation position.

12. The lens barrier opening/closing device according to claim 11, further comprising a linearly movable barrel guided in a direction of said optical axis without rotating about said optical axis, said linearly movable barrel supporting said barrier drive ring at a front end thereof so that said barrier drive ring is rotatable about said optical axis.

13. The lens barrier opening/closing device according to claim 11, further comprising:

at least one engaging portion formed on said barrier drive ring to be engageable with said barrier blade; and a closing biasing device which biases said barrier blade in a direction to close said photographic aperture, a biasing force of said closing biasing device being smaller than that of said opening biasing device, wherein said engaging portion of said barrier drive ring held at a position to open said barrier blade by said biasing force of said opening biasing device pushes said barrier blade to open said barrier blade when said movable lens barrel is in said photographing position, and wherein said engaging portion is disengaged from said barrier blade so that said barrier blade is driven to be closed by said biasing force of said closing biasing device when said barrier drive ring is driven to rotate about said optical axis against said biasing force of said opening biasing device by rotation of said rotational barrel when said movable lens barrel moves from said photographing position to said accommodation position.

14. A camera comprising:

a movable lens barrel driven to move between a photographing position an accommodation position when the power of said camera is turned ON and OFF, respectively;

at least one barrier blade driven to open and close a photographic aperture formed at the front of said movable lens barrel when said movable lens barrel is in said photographing position and said accommodation position, respectively;

a barrier drive ring driven to rotate about an optical axis to drive said at least one barrier blade;

at least one spring which biases said barrier drive ring in a direction to open said barrier blade;

a rotational barrel which rotates about said optical axis when said movable lens barrel moves between said accommodation position and said photographing position;

a lever formed on said barrier drive ring to extend toward said rotational barrel, said lever including a first engaging surface extending parallel to said optical axis; and a recess formed on said rotational barrel so that said lever can enter said recess in a direction of said optical axis, said recess including a second engaging surface extending parallel to said optical axis, wherein said first engaging surface and said second engaging surface are engaged with each other to rotate said barrier drive ring about said optical axis in a direction to close said barrier blade against said biasing force of said biasing device when said movable lens barrel moves from said photographing position to said accommodation position.

15. A lens barrier opening/closing device of a movable lens barrel driven to move between an accommodation position and a photographing position, comprising:

at least one barrier blade which is driven to open and close a photographic aperture formed at the front end wall of said movable lens barrel when said movable lens barrel is in said photographing position and said accommodation position, respectively;

a linearly movable barrel guided in a direction of an optical axis without rotating about said optical axis;

a barrier drive ring driven to rotate about said optical axis to drive said barrier blade, said linearly movable barrel supporting said barrier drive ring in a front end of said linearly movable barrel to be rotatable about said optical axis; and a pair of ring biasing springs positioned between said barrier drive ring and said linearly movable barrel on opposite sides with respect to said optical axis in a radial direction to bias said barrier drive ring in a predetermined rotational direction, wherein said barrier drive ring is driven to rotate in a rotational direction opposite to said predetermined rotational direction against a biasing force of said pair of ring biasing springs by a movement of a movable member provided in said lens barrel when said movable lens barrel moves from one of said photographing position and said accommodation position to the other of said photographing position and said accommodation position.

16. The lens barrier opening/closing device according to claim 15, further comprising:

at least one barrier biasing spring which biases said barrier blade in a direction opposite to a biasing direction of said pair of ring biasing springs toward one of an open position and a closed position of said barrier blade, wherein a biasing force of said barrier biasing spring is smaller than that of said pair of ring biasing springs, and wherein said barrier blade is driven by said biasing force of said barrier biasing spring to move to one of said open position and said closed position when said barrier drive ring is driven to rotate against said biasing force of said pair of ring biasing springs.

17. The lens barrier opening/closing device according to claim 16, wherein said at least one barrier blade comprises at least one pair of barrier blades, wherein said at least one barrier biasing spring comprises a pair of barrier biasing springs positioned on opposite sides with respect to said optical axis in said radial direction of said at least one pair of barrier blades in a radial direction to bias each of said at least one pair of barrier blades toward one of said open position and said closed position, wherein said barrier drive ring comprises at least one pair of engaging portions which can be engaged with said at least one pair of barrier blades, respectively, wherein said barrier drive ring is engaged with at least one pair of said barrier blades to push said at least one pair of barrier blades via said at least one pair of engaging portions against a biasing force of said pair of barrier biasing springs when driven to rotate about said optical axis in said predetermined rotational direction, and wherein said barrier drive ring is disengaged from said at least one pair of barrier blades when driven to rotate about the optical axis against a biasing force of said pair of ring biasing springs via said movement of said movable member.

18. The lens barrier opening/closing device according to claim 15, wherein said linearly movable barrel comprises a pair of first protrusions positioned on opposite sides with respect to said optical axis in said radial direction, wherein said barrier drive ring comprises a pair of second protrusions positioned on opposite sides with respect to said optical axis in said radial direction, wherein said pair of ring biasing springs are formed as two helical extension springs, and wherein the opposite ends of one of said two helical extension springs are connected to one of said pair of first protrusions and one of said pair of second protrusions, respectively, while the opposite ends of the other of said two helical extension springs are connected to the other of said pair of first protrusions and the other of said pair of second protrusions, respectively.

19. The lens barrier opening/closing device according to claim 15, wherein said pair of ring biasing springs bias said barrier drive ring in a first rotational direction to drive said barrier blade to open said photographic aperture, and wherein said barrier drive ring is driven to rotate in a second rotational direction opposite to said first rotational direction to drive said barrier blade to close said photographic aperture when said movable lens barrel moves from said photographing position to said accommodation position.

20. The lens barrier opening/closing device according to claim 15, wherein said barrier biasing spring comprises at least one torsion spring.

21. The lens barrier opening/closing device according to claim 15, wherein said movable lens barrel is an element of a zoom lens of a camera.

22. The lens barrier opening/closing device according to claim 21, wherein said linearly movable barrel functions as a movable lens hood which advances relative to said rotational barrel when said zoom lens is set at a telephoto extremity thereof having a narrow angle of view, and which retreats relative to the rotational barrel when said zoom lens is set at a wide-angle extremity thereof having a wide angle of view.

23. A camera comprising:

a movable lens barrel driven to move between a photographing position an accommodation position when the power of said camera is turned ON and OFF, respectively;

at least one barrier blade driven to open and close a photographic aperture formed at the front of said movable lens barrel when said movable lens barrel is in said photographing position and said accommodation position, respectively;

a linearly movable barrel guided in a direction of an optical axis without rotating about said optical axis;

a barrier drive ring driven to rotate about said optical axis to drive said barrier blade, said linearly movable barrel supporting said barrier drive ring in a front end thereof so that said barrier drive ring is rotatable about said optical axis;

a rotational barrel which rotates about said optical axis when said movable lens barrel moves between said accommodation position and said photographing position; and a pair of springs positioned between said barrier drive ring and said linearly movable barrel on opposite sides, with respect to said optical axis in a radial direction, to bias said barrier drive ring in a predetermined rotational direction, wherein said barrier drive ring is driven to rotate in a rotational direction opposite to said biased rotational direction by rotation of said rotational barrel when said movable lens barrel moves from one of said photographing position and said accommodation position to the other of said photographing position and said accommodation position.

24. The lens barrier opening/closing device according to claim 1, further comprising a moving mechanism that moves said barrier drive ring and said rotational barrel so that a relative distance between said rotational barrel and said barrier drive ring along the optical axis is varied in accordance with rotation of said rotational barrel.

25. The lens barrier opening/closing device according to claim 11, further comprising a moving mechanism that moves said barrier drive ring and said rotational barrel so that a relative distance between said rotational barrel and said barrier drive ring along the optical axis is varied in accordance with rotation of said rotational barrel.

26. The camera according to claim 14, further comprising a moving mechanism that moves said barrier drive ring and said rotational barrier so that a relative distance between said rotational barrier and said barrier drive ring along the optical axis is varied in accordance with rotation of said rotational barrel.

27. The lens barrier opening/closing device according to claim 15, further comprising:

a rotational barrel which at least rotates about said optical axis when said linearly movable lens barrel moves between said accomodation position and said photographing position; and a moving mechanism that moves said barrier drive ring and said rotational barrier so that a relative distance between said rotational barrier and said barrier drive ring along the optical axis is varied in accordance with rotation of said rotational barrel.

28. The camera according to claim 23, further comprising a moving mechanism that moves said barrier drive ring and said rotational barrier so that a relative distance between said rotational barrier and said barrier drive ring along the optical axis is varied in accordance with rotation of said rotational barrel.

* * * * *